United States Patent
Gleixner et al.

(10) Patent No.: US 10,306,469 B2
(45) Date of Patent: May 28, 2019

(54) METADATA DELIVERY METHOD FOR PROSE COMMUNICATION AND RELATED APPARATUSES USING THE SAME

(71) Applicant: Industrial Technology Research Institute, Hsinchu (TW)

(72) Inventors: Stephan Gleixner, Hsinchu County (TW); Shubhranshu Singh, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/379,506

(22) Filed: Dec. 15, 2016

(65) Prior Publication Data

US 2017/0171900 A1   Jun. 15, 2017

Related U.S. Application Data

(60) Provisional application No. 62/267,295, filed on Dec. 15, 2015.

(51) Int. Cl.
*H04W 12/06* (2009.01)
*H04W 76/14* (2018.01)

(52) U.S. Cl.
CPC .......... *H04W 12/06* (2013.01); *H04W 76/14* (2018.02)

(58) Field of Classification Search
CPC ............................. H04W 12/06; H04W 76/14
See application file for complete search history.

(56) References Cited

U.S. PATENT DOCUMENTS

| 8,260,266 B1 | 9/2012 | Amidon et al. |
| 2015/0312718 A1 | 10/2015 | Stephens et al. |

(Continued)

FOREIGN PATENT DOCUMENTS

| CN | 104937989 | 9/2015 |
| CN | 104980911 | 10/2015 |
| TW | 201427458 | 7/2014 |

OTHER PUBLICATIONS

Doumiati et al., "Analytical study of a service discovery system based on an LTE-A D2D implementation", Physical Communication, Feb. 1, 2016, pp. 1-18.

(Continued)

*Primary Examiner* — Lewis G West
(74) *Attorney, Agent, or Firm* — JCIPRNET

(57) ABSTRACT

The disclosure is directed to a metadata delivery method and related apparatuses using the same method. According to one of the exemplary embodiments, the disclosure is directed to a metadata delivery method used by a ProSe Function. The method would include not limited to: receiving a first Authentication Response which includes not limited to a metadata indicator; creating a binding information between the metadata indicator and a RPAUID in response to receiving the first Authentication Response; receiving a Match Report comprising the RPAUID; transmitting a second Authentication Request message which includes not limited to the metadata indicator in response to determining the RPAUID matches the metadata indicator; receiving a second Authentication Response which includes not limited to a metadata corresponding to the metadata indicator; and transmitting a Match Report Acknowledgment which includes not limited to the metadata in response to receiving the second.

20 Claims, 18 Drawing Sheets

(56) References Cited

U.S. PATENT DOCUMENTS

| | | | |
|---|---|---|---|
| 2016/0088446 A1 | 3/2016 | Stephens et al. | |
| 2016/0088583 A1* | 3/2016 | Stephens | H04W 4/06 |
| | | | 455/456.6 |
| 2016/0242019 A1 | 8/2016 | Vanderveen et al. | |
| 2016/0286373 A1* | 9/2016 | Chen | H04W 8/005 |
| 2016/0295347 A1* | 10/2016 | Ahmad | H04W 4/005 |
| 2017/0303322 A1* | 10/2017 | Watfa | H04W 76/021 |

OTHER PUBLICATIONS

Prasad et al., "Energy-Efficient D2D Discovery for Proximity Services in 3GPP LTE-Advanced Networks", IEEE Vehicular Technology Magazine, Dec. 2014, pp. 1-11.
Pyattaev et al., "3GPP LTE-Assisted Wi-Fi-Direct: Trial Implementation of Live D2D Technology", ETRI Journal, Oct. 2015, pp. 1-11.
Qualcomm Inc., "Updating Restricted Discovery procedures to ensure latest metadata for the monitoring UE", 3GPP SA WG2 Meeting #112 S2-154248, Nov. 2015, pp. 1-22.
Mumtaz et al., "Direct Mobile-To-Mobile Communication: Paradigm for 5G", IEEE Wireless Communications, Oct. 2014, pp. 1-10.
3GPP., "Technical Specification Group Services and System Aspects; Proximity-based services (ProSe)", 3GPP TS 23.303 V13.4.0, Jun. 2016, pp. 1-124.

* cited by examiner

METADATA DELIVERY METHOD FOR PROSE COMMUNICATION AND RELATED APPARATUSES USING THE SAME

CROSS-REFERENCE TO RELATED APPLICATION

This application claims the priority benefits of U.S. provisional application Ser. No. 62/267,295, filed on Dec. 15, 2015. The entirety of the above-mentioned patent application is hereby incorporated by reference herein and made a part of this specification.

TECHNICAL FIELD

The disclosure is directed to a metadata delivery method for ProSe discovery and communication and related apparatuses using the same method.

BACKGROUND

Metadata handling of ProSe Direct Discovery in the application of Proximity-based Service (ProSe) has been a topic under discussion. ProSe refers to an established Third Generation Partnership Project (3GPP) term which refers to device-to-device (D2D) discovery and communications. In case of Prose, communications takes place directly between two devices that are in proximity to each other without having an intermediary device delivering data in between. The stage 2 ProSe specification as described in 3GPP technical specification TS 23.303 defines two ProSe direct service types which are ProSe Direct Discovery and ProSe Direct Communication as well as two direct discovery types which are Open ProSe and Restrict ProSe Discovery. TS 23.303 is incorporated by references for the entirety of this document for the definition of terms and concepts.

According to TS 23.303, ProSe Direct Discovery refers to a procedure employed by a ProSe-enabled UE to discover other ProSe-enabled UEs in its vicinity by using only the capabilities that are common to the two UEs with E-UTRA technology. Restricted ProSe Direct Discovery refers to ProSe Discovery that would only take place with explicit permission from another ProSe-enabled UE that was discovered by a ProSe-enabled UE. Open ProSe Direct Discovery refers to ProSe Discovery that takes place without explicit permission from another ProSe-enabled UE that was discovered by a ProSe-enabled UE. Also described in TS 23.303 is Metadata which refers to data corresponding to the ProSe Application ID or Restricted ProSe Application User ID such as a postal address, phone number, URL, and etc. Moreover, Announcing UE refers to an UE that wants to spread certain information or to announce certain information such as a restaurant wanting to make itself known and to make known its menu. A monitoring UE refers to an UE that wants to monitor information being spread, such as a person looking for a restaurant or a restaurant menu.

The current state of the art mechanism as described in TS 23.303 without the adopted solution described in 3GPP technical document S2-152320 would define that the Home Public Land Mobile Network (HPLMN) ProSe Function of the monitoring UE would obtain the metadata with the optional Authentication Request/Response procedure as described in steps 4a and step 4b of the Match Report procedures which are also described in TS 23.303. However, TS 23.303 does not actually specify when the procedure of obtaining the metadata with the optional Authentication Request/Response is executed. Thus, if the ProSe Function does not send the Authentication Request, the ProSe Function would not be able to obtain the metadata and hence cannot send the metadata to the Monitoring UE.

To describe in more detail, refer to FIG. 1 which illustrates a Match Report procedure according to TS 23.303. In step S101, a ProSe enabled UE would transmit to a ProSe Function a Match Report with parameters including but not limited to a UE identity, a Discovery Type, an Application ID, a ProSe Restricted Code, and so forth. In step S102, in response to receiving the Match Report, the ProSe Function would perform discovery authentication. In step S103, the ProSe Function may perform an analysis of the received Prose Restricted Code. In step S104a, the ProSe Function may optionally transmit an Authentication Request to the ProSe application server. In S104b, the ProSe Function may optionally receive from the ProSe application server an Authentication Response which may include a field containing metadata. After a verification procedure of step S104c, in step S105, the ProSe Function may transmit to the ProSe enabled UE a Match Report Acknowledgment which may include the metadata.

Based on the procedure of FIG. 1, it can be seen that the metadata might not be delivered to the ProSe enabled UE since step S104a and step S104b are optional steps which may or may not be executed. If the ProSe Function does not send the Authentication Request in the first place, the ProSe Function will not be able to obtain the Metadata in order to send it to the ProSe enabled UE which could be a monitoring UE. Also, the current state of the art mechanism described in TS 23.303 does not actually define a mechanism to enable an Announcing UE learn if the ProSe Function has delivered the Metadata to a certain Monitoring UE. Moreover, the current state of the art mechanisms described in TS 23.303 also does not define a method to allow the Announcing UE to request a Metadata Delivery Receipt and to allow the Monitoring UE to block a Metadata Delivery Receipt to the Announcing UE.

SUMMARY OF THE DISCLOSURE

Accordingly, is directed to a metadata delivery method for ProSe discovery and communication and related apparatuses using the same method.

In one of the exemplary embodiments, the disclosure is directed to a metadata delivery method used by a proximity-based services (ProSe) Function. The method would include but not limited to: receiving a first Authentication Response which includes not limited to a metadata indicator, creating a binding information between the metadata indicator and a Restricted ProSe Application User ID (RPAUID) in response to receiving the first Authentication Response; receiving a Match Report comprising the RPAUID; transmitting a second Authentication Request which includes not limited to the metadata indicator in response to determining the RPAUID matches the metadata indicator; receiving a second Authentication Response which includes not limited to a metadata corresponding to the metadata indicator, and transmitting a Match Report Acknowledgment which includes not limited to the metadata in response to receiving the second Authentication Response.

In one of the exemplary embodiment, the disclosure is directed to a proximity based services (ProSe) Function which includes but not limited to: a transmitter; a receiver; and a processor coupled to the transmitter and the receiver and is configured at least to: receive, via the receiver, a first Authentication Response which includes not limited to a metadata indicator; create a binding information between the metadata indicator and a Restricted ProSe Application User ID (RPAUID) in response to receiving the first Authentication Response; receive, via the receiver, a Match Report comprising the RPAUID; transmit, via the transmitter, a second Authentication Request message which includes not limited to the metadata indicator in response to determining the RPAUID matches the metadata indicator; receive, via the receiver, an Authentication Response which includes not limited to a metadata corresponding to the metadata indicator, and transmit, via the transmitter, a Match Report Acknowledgment which includes not limited to the metadata in response to receiving the second Authentication Response.

In order to make the aforementioned features of the disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the disclosure and is therefore not meant to be limiting or restrictive in any manner. Also the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
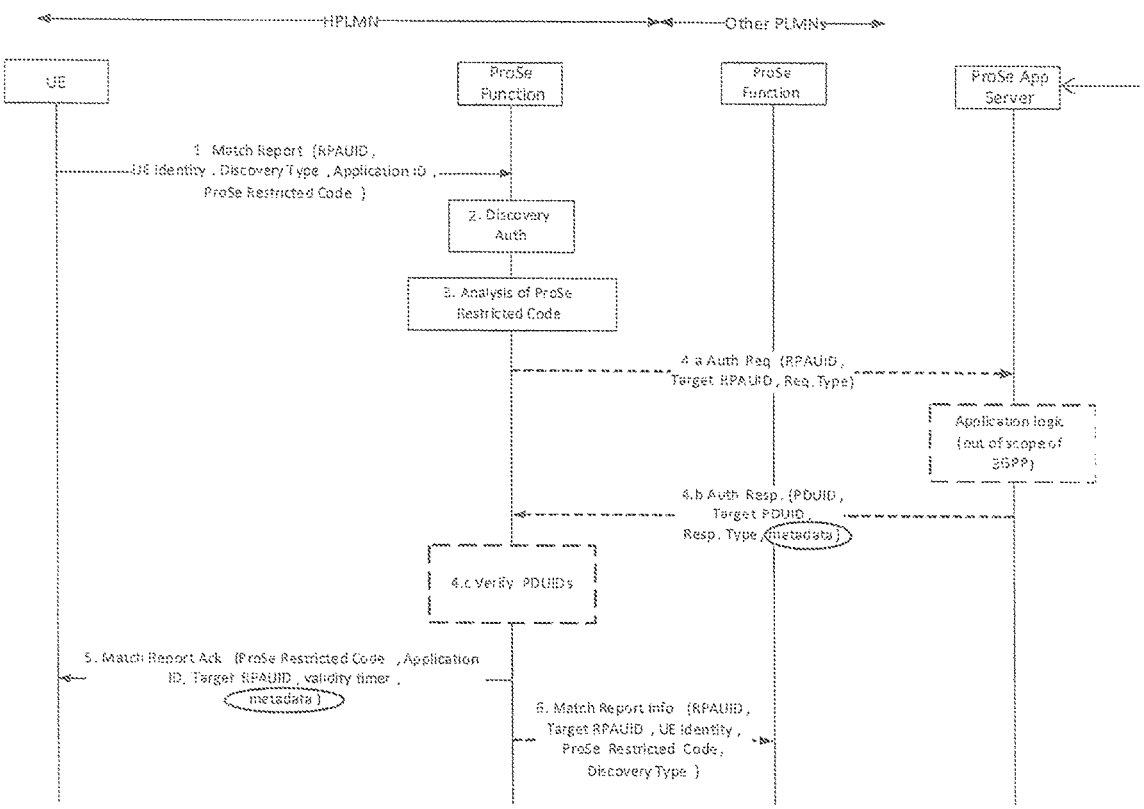
FIG. 1 illustrates a Match Report procedure which obtains metadata through optional Authentication Request/Response message according to TS 23.303.

Reference will now be made in detail to the present exemplary embodiments of the disclosure, examples of which are illustrated in the accompanying drawings. Wherever possible, the same reference numbers are used in the drawings and the description to refer to the same or like parts.

The disclosure provides a method and related apparatuses to ensure that metadata is delivered to a monitoring UE for restricted ProSe Direct Discovery. Further, the method and related apparatuses may inform an announcing UE that metadata has been delivered to certain monitoring UEs for Open and Restrict Discovery. Moreover, the disclosure and apparatuses would enable the announcing UE to request a metadata delivery receipt and would also enable the monitoring UE to block a metadata delivery receipt to the announcing UE for Open and Restricted Discovery. The concept of the disclosure could further be explained as follows.

In general, for Restricted ProSe Direct Discovery, if the Announcing UE has provided metadata to the Application Server, and this Application Server receives an Authentication Request which could be triggered by a Discovery Request message from a Monitoring UE from the ProSe Function in HPLMN of the Monitoring UE, then the ProSe Application Server would transmit an Authentication Response message with a metadata indicator information element (IE) to the ProSe Function in HPLMN of Monitoring UE.

If the ProSe Function in HPLMN of Monitoring UE receives a metadata Indicator IE, the ProSe Function in HPLMN of Monitoring UE would store the metadata indicator IE in the binding information of ProSe Restricted Code. The ProSe Restricted Code is used for restricted ProSe Direct Discovery. For the announcing UE, the ProSe Restricted Code is obtained from the HPLMN ProSe Function by using an Announce Request procedure (see clause 5.3.3.2A, and 5.3.3.3A). The ProSe Restricted Code is contained in the message that is transmitted by a UE engaged in the ProSe Direct Discovery procedure to monitoring UEs. A ProSe Restrict Code is composed of a RPAUID and the PLMN ID of the ProSe Function that assigned the ProSe Restricted Code.

If the ProSe Function in HPLMN of Monitoring UE has stored the metadata indicator IE in the binding information of ProSe Restricted Code, the ProSe Function would transmit an Authentication Request message to the ProSe Application Server. Otherwise, if the ProSe Function in HPLMN of Monitoring UE has not stored the metadata indicator IE in the binding information of ProSe Restricted Code, then the Authentication Request message is optional.

A metadata delivery receipt could be sent to an Announcing UE if metadata has been delivered to a Monitoring UE. In case that that the Announcing UE and the Monitoring UE are in the same HPLMN which means that they use the same ProSe Function, then the metadata delivery receipt would be delivered from the ProSe Function in HPLMN of Monitoring UE directly to the Announcing UE (either as a new message or as an IE in an existing message).

In case that that Announcing UE and Monitoring UE are not in the same PLMN which means that they don't use the same HPLMN ProSe Function, then for Restricted ProSe Direct Discovery, metadata delivery receipt IE would be sent in the Match Report Information message from a ProSe Function in HPLMN of Monitoring UE to a ProSe Function in HPLMN of Announcing UE. The metadata delivery receipt subsequently sent to the Announcing UE would either be as a new message or as an IE in an existing message. As for Open ProSe Direct Discovery, the metadata delivery receipt IE would be transmitted from ProSe Function in HPLMN of Monitoring UE to ProSe Function in HPLMN of the Announcing UE either as a new message or as an IE in an existing message. Subsequently the metadata delivery receipt would be sent to the Announcing UE either as a new message or as an IE in an existing message.

For Restricted ProSe Direct Discovery, send Metadata Delivery Receipt request from Announcing UE to Application Server, and then from that Application Server to ProSe Function in HPLMN of Monitoring UE.

For Open ProSe Direct Discovery, send Metadata Delivery Receipt request from Announcing UE to ProSe Function in HPLMN of Announcing UE.

For Restricted ProSe Direct Discovery, send Metadata Delivery Receipt=Allowed/Not Allowed indication from Monitoring UE to ProSe Function in HPLMN of Monitoring UE.

If the ProSe Function in HPLMN of Monitoring UE has received a Metadata Delivery Receipt request from the Announcing UE (via the Application Server) and a Metadata Delivery Receipt=Allowed indication from the Monitoring UE and Announcing UE and Monitoring UE are in the same PLMN, i.e. use the same HPLMN ProSe Function, send Metadata Delivery Receipt to the Announcing UE (either as a new message, or as an IE in an existing message).

If the ProSe Function in HPLMN of Monitoring UE has received a Metadata Delivery Receipt request from the Announcing UE (via the Application Server) and a Metadata Delivery Receipt=Allowed indication from the Monitoring UE and Announcing UE and Monitoring UE are not in the same PLMN, i.e. don't use the same HPLMN ProSe Function, send Metadata Delivery Receipt IE in the Match Report Info message from ProSe Function in HPLMN of Monitoring UE to ProSe Function in HPLMN of Announcing UE, and then send Metadata Delivery Receipt to the Announcing UE (either as a new message, or as an IE in an existing message).

For Open ProSe Direct Discovery, in the case that the Announcing UE and the Monitoring UE are in the same PLMN, the metadata delivery receipt would contain an indication or IE of either "Allowed" or "Not Allowed" indication from Monitoring UE to ProSe Function in HPLMN of Monitoring UE.

For Open ProSe Direct Discovery, in case that the Announcing UE and the Monitoring UE are not in the same PLMN, the metadata delivery receipt containing "Allowed" or "Not Allowed" indication would be transmitted from the Monitoring UE to the ProSe Function in HPLMN of Monitoring UE and subsequently from the ProSe Function in HPLMN of the Monitoring UE to the ProSe Function in HPLMN of the Announcing UE.

If the ProSe Function in HPLMN of Announcing UE has received a metadata delivery receipt request from the Announcing UE and a metadata delivery receipt="Allowed" indication from the Monitoring UE and the Announcing UE and the Monitoring UE are in the same PLMN, the metadata delivery receipt would be sent to the Announcing UE either as a new message, or as an IE in an existing message.

If the ProSe Function in HPLMN of Monitoring UE has received a metadata delivery receipt="Allowed" indication from the Monitoring UE and has sent the metadata to the Monitoring UE, and the Announcing UE and the Monitoring UE are in the same PLMN, the metadata delivery receipt would be transmitted to the ProSe Function in HPLMN of Announcing UE either as a new message or as an IE in an existing message.

If the ProSe Function in HPLMN of Announcing UE has received a metadata delivery receipt request from the Announcing UE and a metadata delivery Receipt="Allowed" indication from the Monitoring UE via the ProSe Function in HPLMN of Monitoring UE and a Metadata Delivery Receipt from the ProSe Function in HPLMN of Monitoring UE, and Announcing UE and Monitoring UE are not in the same PLMN, then the metadata delivery receipt would be sent to the Announcing UE either as a new message, or as an IE in an existing message.

To elucidate the above described concepts of the disclosure, several exemplary embodiments are provided in the following figures and corresponding written descriptions. FIG. 2~FIG. 7 and their corresponding written descriptions propose a solution to address the issue of metadata delivery to a monitoring UE for restricted ProSe Direction Discovery.

Figure 2:
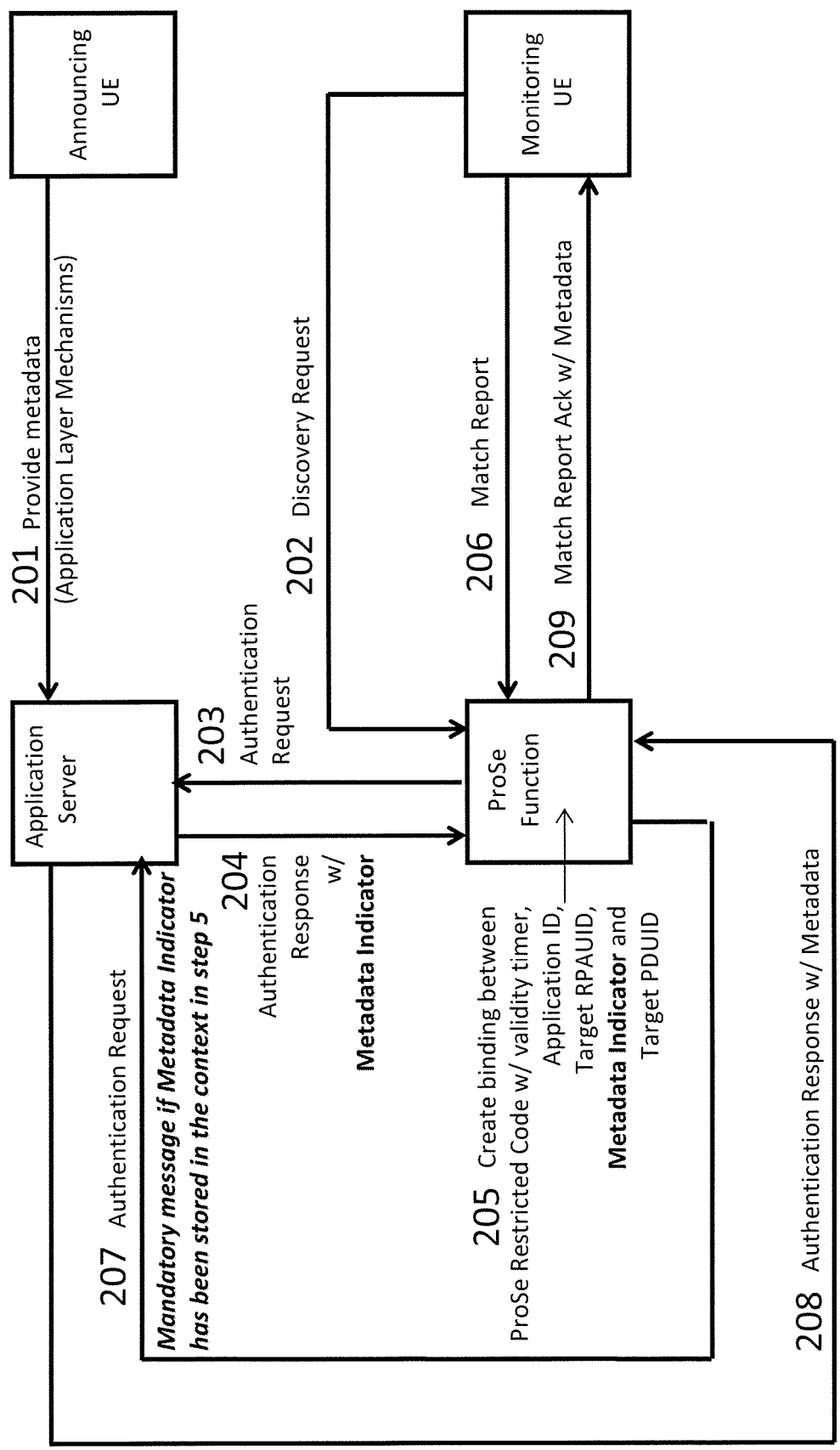
FIG. 2 illustrates a metadata delivery procedure in accordance with a first exemplary embodiment of the disclosure.

FIG. 2 illustrates a metadata delivery procedure in accordance with a first exemplary embodiment of the disclosure. For this exemplary embodiment, the modified Match Report procedure would include not limited to the steps shown in FIG. 2, and the Authentication Request/Response procedure in the Restricted Direct Discovery Match Report procedure would be made mandatory if metadata associated with a given Restricted ProSe Application User ID (RPAUID). In step S201, an announcing UE may optionally provide to the ProSe Application Server a metadata which could be associated with a RPAUID. In step S202, the monitoring UE may send a Discovery Request to the ProSe Function in HPLMN. In step S203, the ProSe Function in HPLMN may send an Authentication Request to ProSe Application Server. In step S204, in response to receiving the Authentication Request, the ProSe Application Sever would transmit to the ProSe Function an Authentication Response which may include, amongst other parameters, a metadata Indicator.

In step S205, the ProSe Function in HPLMN would create binding information among a ProSe Restricted Code with a validity timer, an application ID, a target RPAUID, a metadata Indicator, and a target ProSe Discovery UE ID (PDUID). The application ID is associated with a particular application hosted by the Application Server. The metadata indicator would indicate whether the metadata received from the Announcing UE is associated with a given RPAUID which in this case is an ID of the Announcing UE. The subsequent Match Report procedure for Restricted Direct Discovery would be made mandatory if the metadata is assumed to associate with the RPAUID.

In step S206, when the Monitoring UE has received wirelessly a ProSe Restricted Code that matches the Discovery Filter which the Monitoring UE has obtained from a Monitor request procedure and other conditions, the Monitoring UE would send a Match Report to ProSe Function in HPLMN. In step S207, the ProSe Function in HPLMN would send an Authentication Request to the ProSe Application Server. This Authentication Request Message would have been optional in TS 23.303. However, for this exemplary embodiment, the Authentication Request message would be mandatory if the binding information created in step S205 for the ProSe Restricted Code would include the metadata Indicator. In step S208, in response to receiving the Authentication Request, the ProSe Application Server would send Authentication Response with the metadata. In step S209, the ProSe Function in HPLMN would transmit to the Monitoring UE a Match Report Acknowledgment which would include the metadata to the Monitoring UE. It could be seen from FIG. 2 that the above described procedure would deliver the metadata from the Announcing UE to the Monitoring UE as the Authentication Request message in step S207 would be mandatory if a metadata indicator stored in step S205 would indicate that the metadata is tied to a RPAUID.

Figure 3:
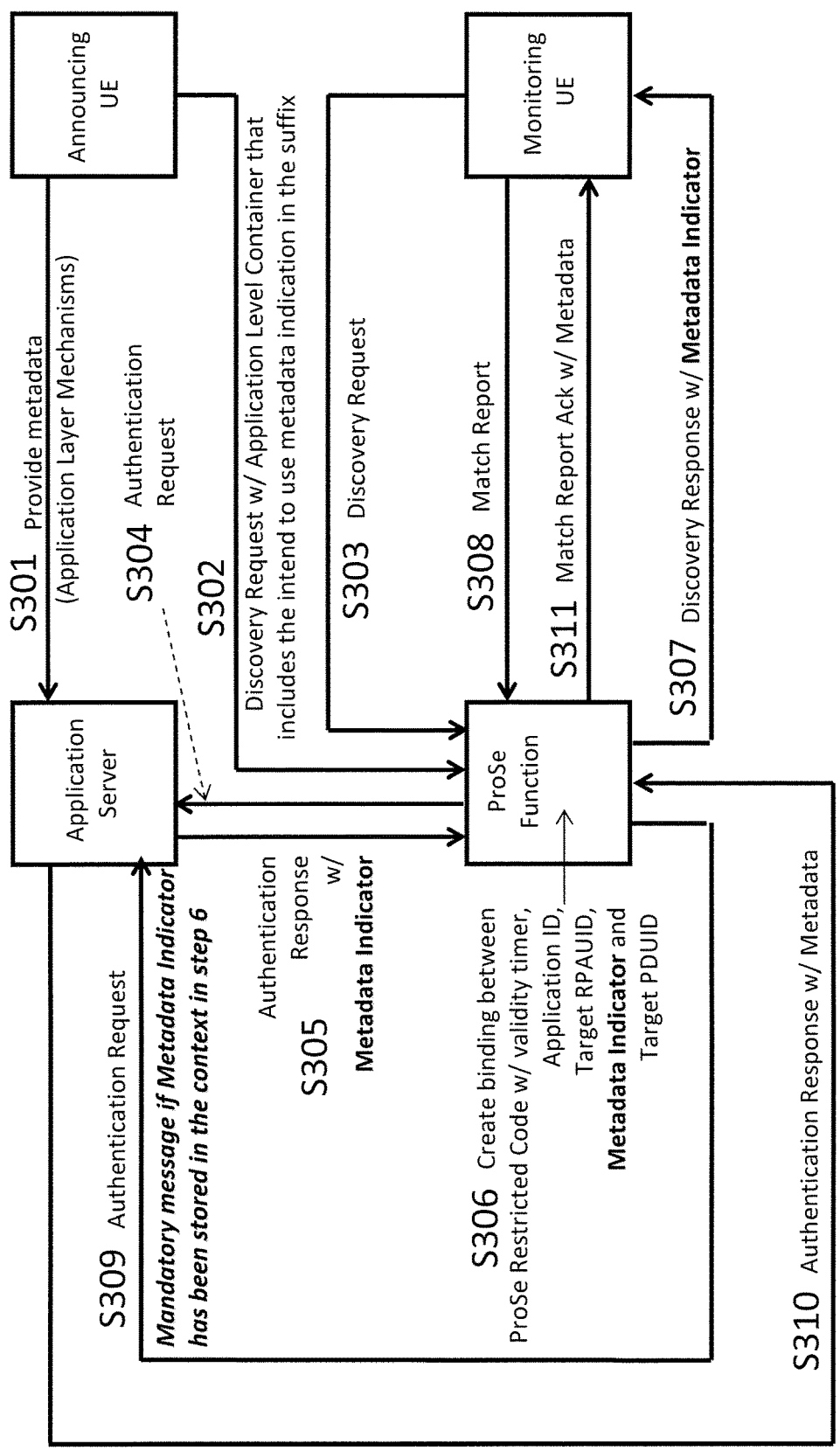
FIG. 3 illustrates a metadata delivery procedure in accordance with a second exemplary embodiment of the disclosure.

FIG. 3 illustrates a metadata delivery procedure in accordance with a second exemplary embodiment of the disclosure. In step S301, an announcing UE may optionally provide to the ProSe Application Server a metadata which could be associated with a RPAUID. In step S302, the Announcing UE would transmit a Discovery Request with application level container that indicates the intended use metadata indication in the suffix. In step S303, the monitoring UE may send a Discovery Request to the ProSe Function in HPLMN. In step S304, the ProSe Function in HPLMN may send an Authentication Request to ProSe Application Server. In step S305, in response to receiving the Authentication Request, the ProSe Application Sever would transmit to the ProSe Function an Authentication Response which may include, amongst other parameters, a metadata Indicator.

In step S306, the ProSe Function in HPLMN would create binding information among a ProSe Restricted Code with a validity timer, an application ID, a target RPAUID, a metadata Indicator, and a target ProSe Discovery UE ID (PDUID). The application ID is associated with a particular application hosted by the Application Server. The metadata indicator would indicate whether the metadata received from the Announcing UE is associated with a given RPAUID which in this case is an ID of the Announcing UE. The target PDUID would be the ID of the Monitoring UE. The subsequent Match Report procedure for Restricted Direct Discovery would be made mandatory if the metadata is assumed to associate with the RPAUID. In step S307, the ProSe Function would transmit a Discovery Response which correspond to the Discovery Request of step S303 with the metadata indicator.

In step S308, when the Monitoring UE has received wirelessly a ProSe Restricted Code that matches the Discovery Filter which the Monitoring UE has obtained from a Monitor request procedure and other conditions, the Monitoring UE would send a Match Report to ProSe Function in HPLMN. In step S309, the ProSe Function in HPLMN would send an Authentication Request to the ProSe Application Server. This Authentication Request Message would be mandatory if the binding information created in step S306 for the ProSe Restricted Code would include the metadata Indicator. The metadata indicator stored in step S306 would indicate that the metadata is tied to a RPAUID. In step S310, in response to receiving the Authentication Request, the ProSe Application Server would send Authentication Response with the metadata. In step S311, the ProSe Function in HPLMN would transmit to the Monitoring UE a Match Report Acknowledgment which would include the metadata to the Monitoring UE.

The exemplary embodiment of FIG. 3 is similar to the exemplary embodiment of FIG. 2, but one notable difference is that the metadata Indicator would included in the Discovery Response message of step S317 from ProSe Function in HPLMN to Monitoring UE.

Figure 4:
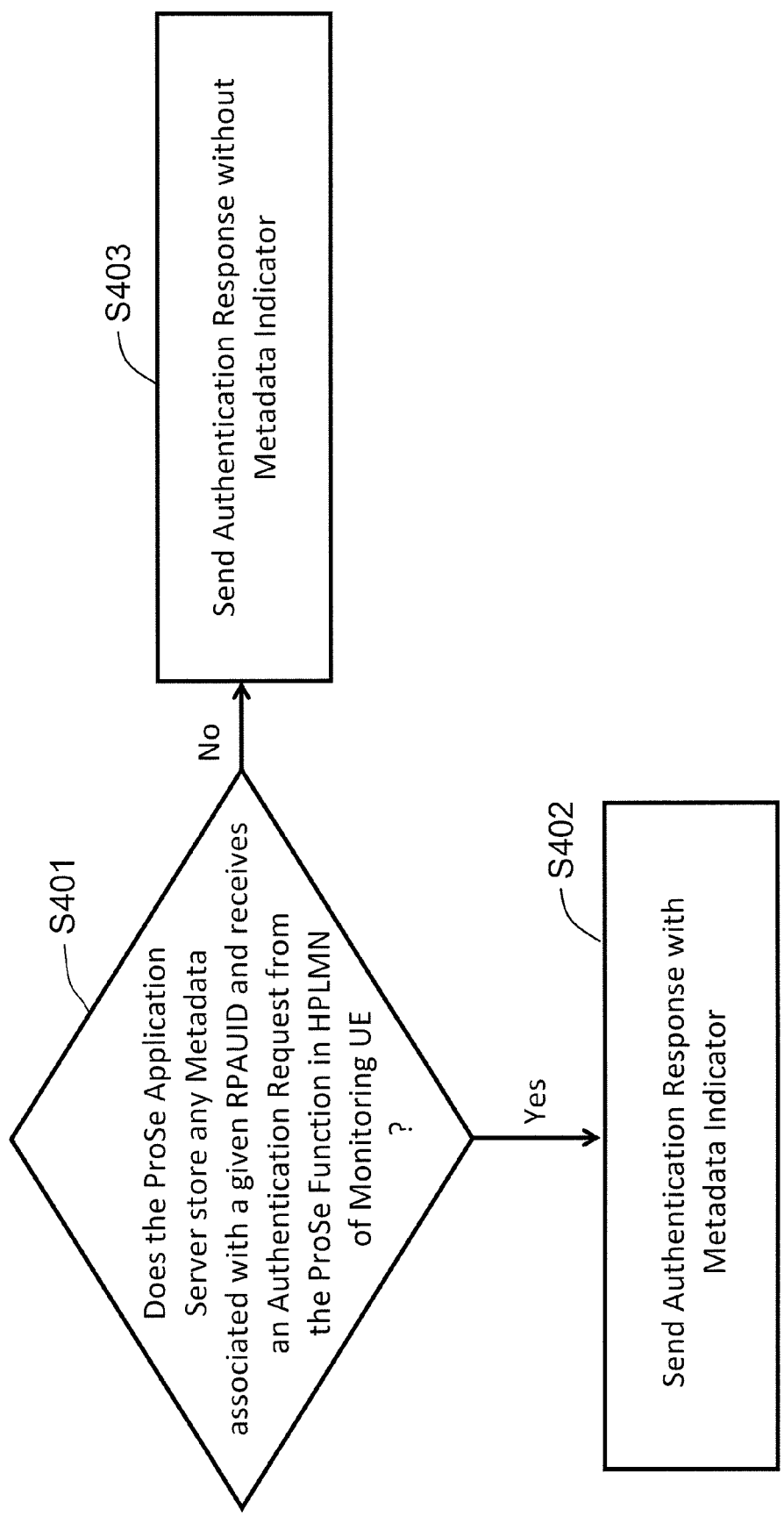
FIG. 4 illustrates a procedure to determine whether to send an Authentication Response with Metadata Indicator in accordance with one of the exemplary embodiments of the disclosure.

FIG. 4 illustrates the procedure of FIG. 2 and FIG. 3 from the perspective of the application server in more detail in accordance with one of the exemplary embodiments of the disclosure. In step S401, the ProSe Application Server would determine whether any metadata is associated with a given RPAUID and whether an Authentication Request has been received from the ProSe Function in HPLMN of the Monitoring UE. If both conditions of step S401 have been satisfied, then in step S402 the ProSe Application Server would transmit an Authentication Response which has a Metadata Indicator. If both conditions of step S401 have not been satisfied, then in step S403 the ProSe Application Server would transmit an Authentication Response which is without a Metadata Indicator.

Figure 5:
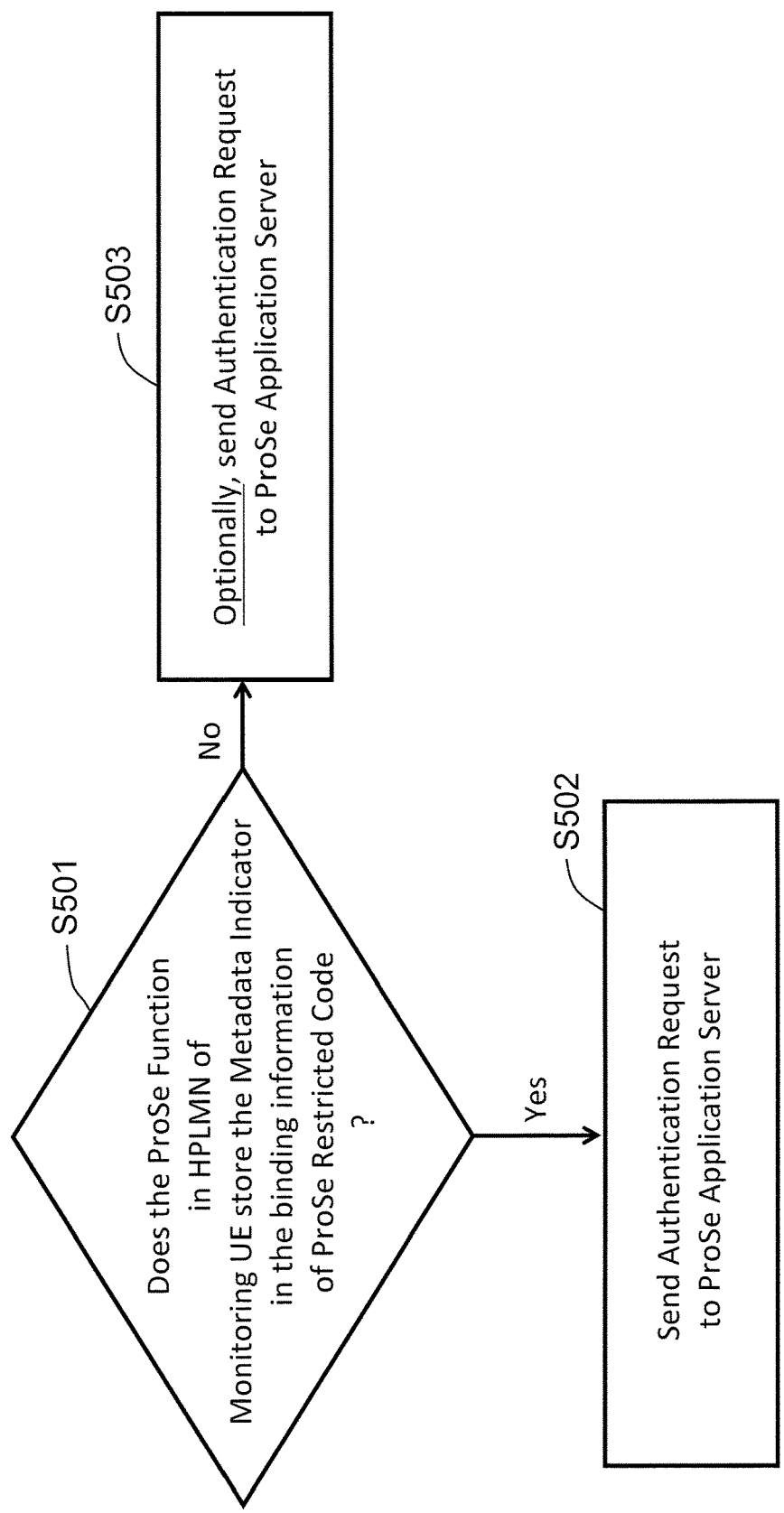
FIG. 5 illustrates a procedure to determine whether sending an Authentication Response message to ProSe Application Server is mandatory in accordance with one of the exemplary embodiments of the disclosure.

FIG. 5 illustrates the procedure of FIG. 2 and FIG. 3 from the perspective of the application server in more detail in accordance with one of the exemplary embodiments of the disclosure. In step S501, the ProSe Function in HPLMN of the Monitor UE would determine whether a metadata indicator has been stored in the binding information in association with a ProSe Restricted Code? If so, then in step S502, the ProSe Function in HPLMN of the Monitor UE would transmit an Authentication Request message to the ProSe Application Server. If not, then in step S503, the ProSe Function in HPLMN of the Monitor UE would optionally transmit an Authentication Request message to the ProSe Application Server.

Figure 6:
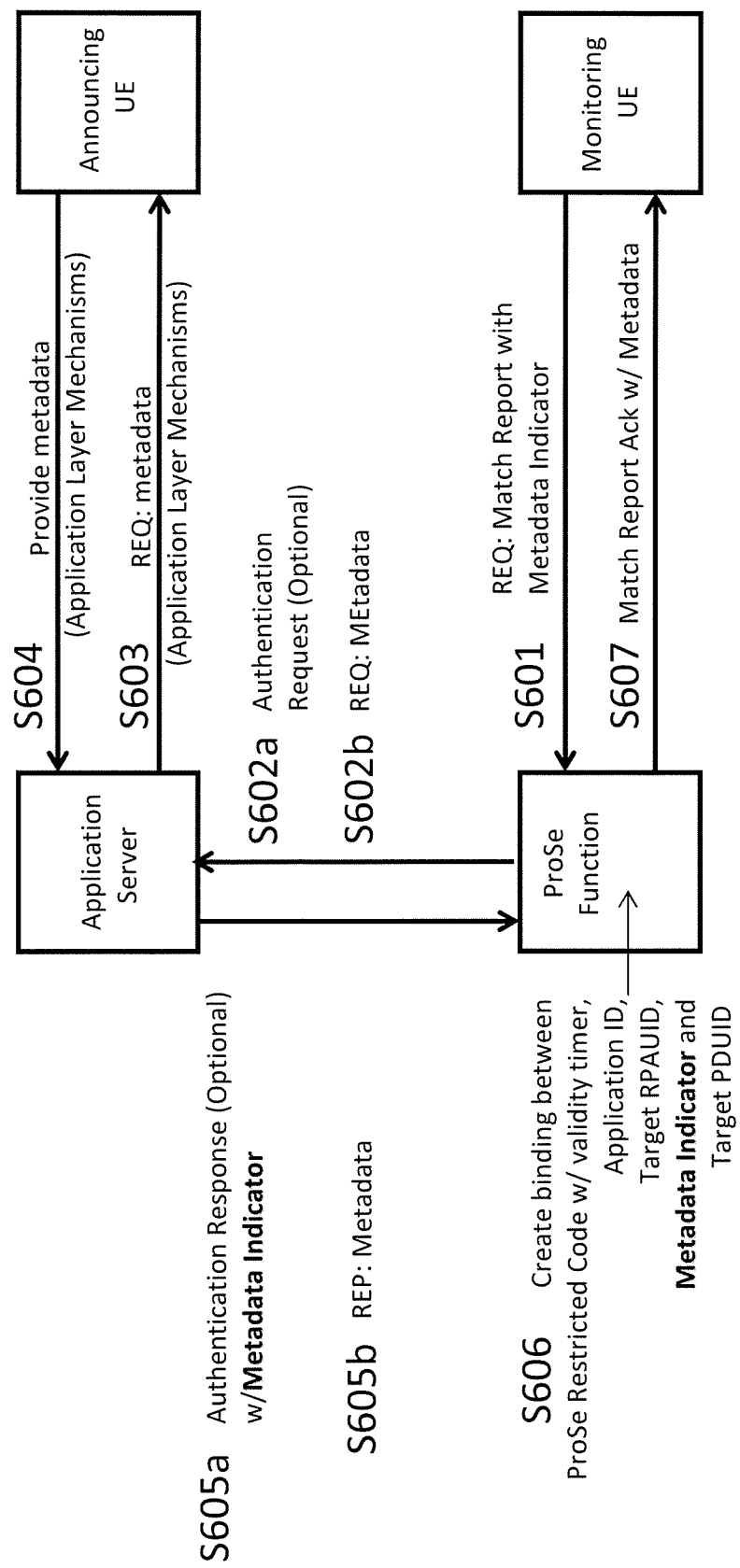
FIG. 6 illustrates a metadata delivery procedure in accordance with a third exemplary embodiment of the disclosure.

FIG. 6 illustrates a metadata delivery procedure in accordance with a third exemplary embodiment of the disclosure. In step S601, the monitoring UE would transmit a request for Match Report with metadata indicator. In step S602a, in response to receiving the request for Match Report, the ProSe Function would optionally transmit to the ProSe Application Server an authentication procedure to authenticate the Monitoring UE. In step S603, the ProSe Application Server would transmit to an Announcing UE a request for metadata. In step S604, in response to receiving the request for metadata, the Announcing UE would transmit the metadata to the ProSe Application Server. In step S605a, the ProSe Application server would optionally transmit to the ProSe Function an Authentication Response which would include the metadata indicator.

In step S606, the ProSe Function would create binding information among a ProSe Restricted Code with a validity timer, an application ID, a target RPAUID, a metadata Indicator, and a target ProSe Discovery UE ID (PDUID). The application ID is associated with a particular application hosted by the Application Server. The metadata indicator would indicate whether the metadata received from the Announcing UE is associated with a given RPAUID which in this case is an application server ID associated with the Announcing UE. The subsequent Match Report procedure for Restricted Direct Discovery would be made mandatory if the metadata is assumed to associate with the RPAUID. After receiving the Authentication Response having the metadata indicator, the ProSe Function would determine whether a binding information exists between the metadata indicator and a target PDUID. If so, in step S602b, the ProSe function would transmit to the ProSe Application Server a request for metadata. In step S605b, the ProSe Application server would transmit to the ProSe Function the Authentication Response having the metadata. In step S607, the ProSe Function would transmit a Match Report Acknowledgment having the requested metadata to the Monitoring UE.

Figure 7:
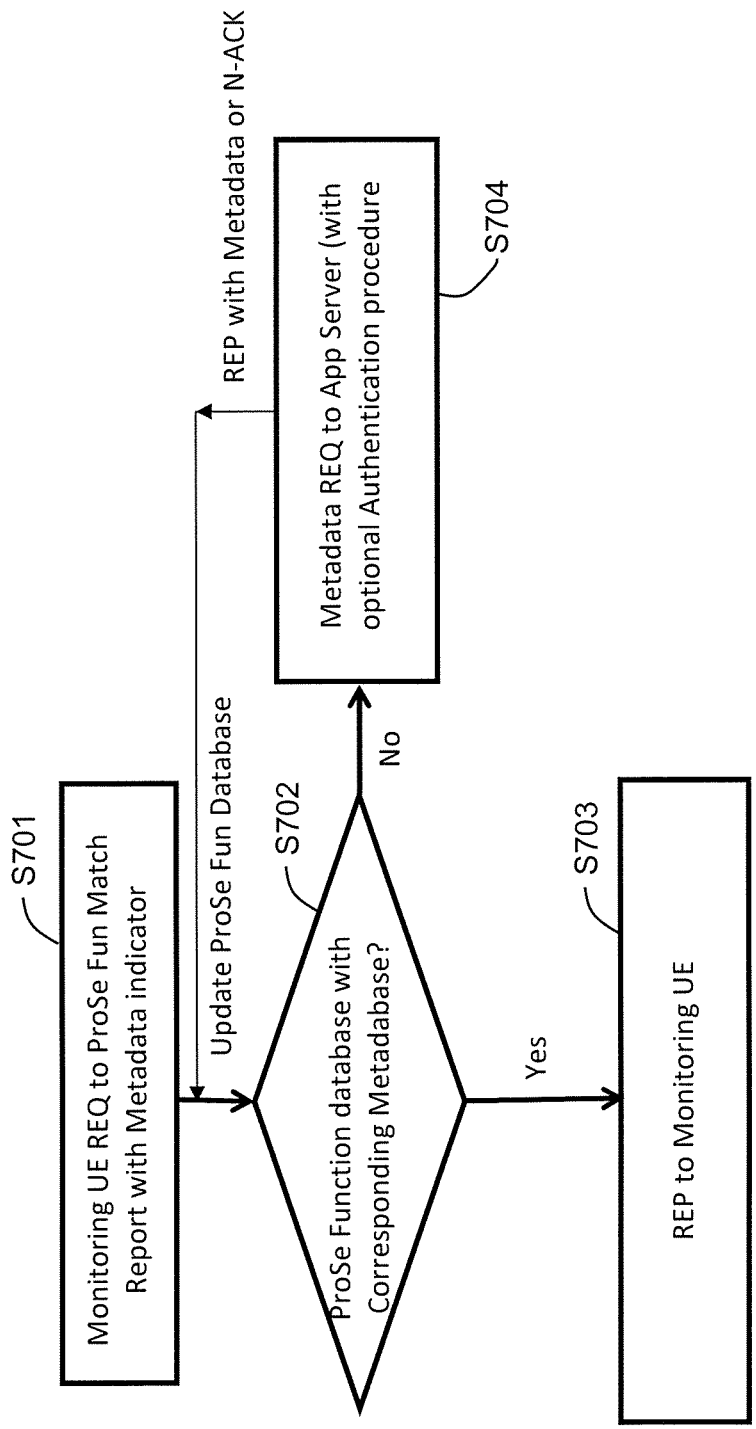
FIG. 7 illustrates a metadata delivery procedure from the perspective of a ProSe function in accordance with a third exemplary embodiment of the disclosure.

FIG. 7 illustrates a metadata delivery procedure from the perspective of the ProSe Function in accordance with a third exemplary embodiment of the disclosure. For the third exemplary embodiment, the metadata requested could be initiated by a Monitoring UE and thus precede a metadata transmitted from an Announcing UE. In step S701, the ProSe Function would monitor whether a Monitoring UE has transmitted a request for Match Reporting having a metadata indicator. In step S702, assuming that the Monitoring UE has transmitted the request for Match Reporting having the metadata indicator, the ProSe function would determine from its database whether a binding information has been created having the metadata indicator tied to a particular RPAUID. If so, then in step S703, the ProSe Function would transmit a Match Report acknowledgment (or response) having the metadata to the Monitor UE. If no such binding information exists, then in step S704, the ProSe Function would transmit a metadata Request to an Application Server along with an optional Authentication procedure. The metadata Request could be in the form of a negative acknowledgment (N-ACK). After step S704, step S702 would be executed.

FIG. 8~FIG. 11. and their corresponding written description propose a solution to inform an Announcing UE that metadata has been delivered to certain monitoring UEs for Open and Restrict Discovery. In this way, the Announcing UE may know which Monitor UEs has receiving the metadata and thus the Monitor UEs that could be interested in the messages that the Announcing UE is trying to deliver.

Figure 8:
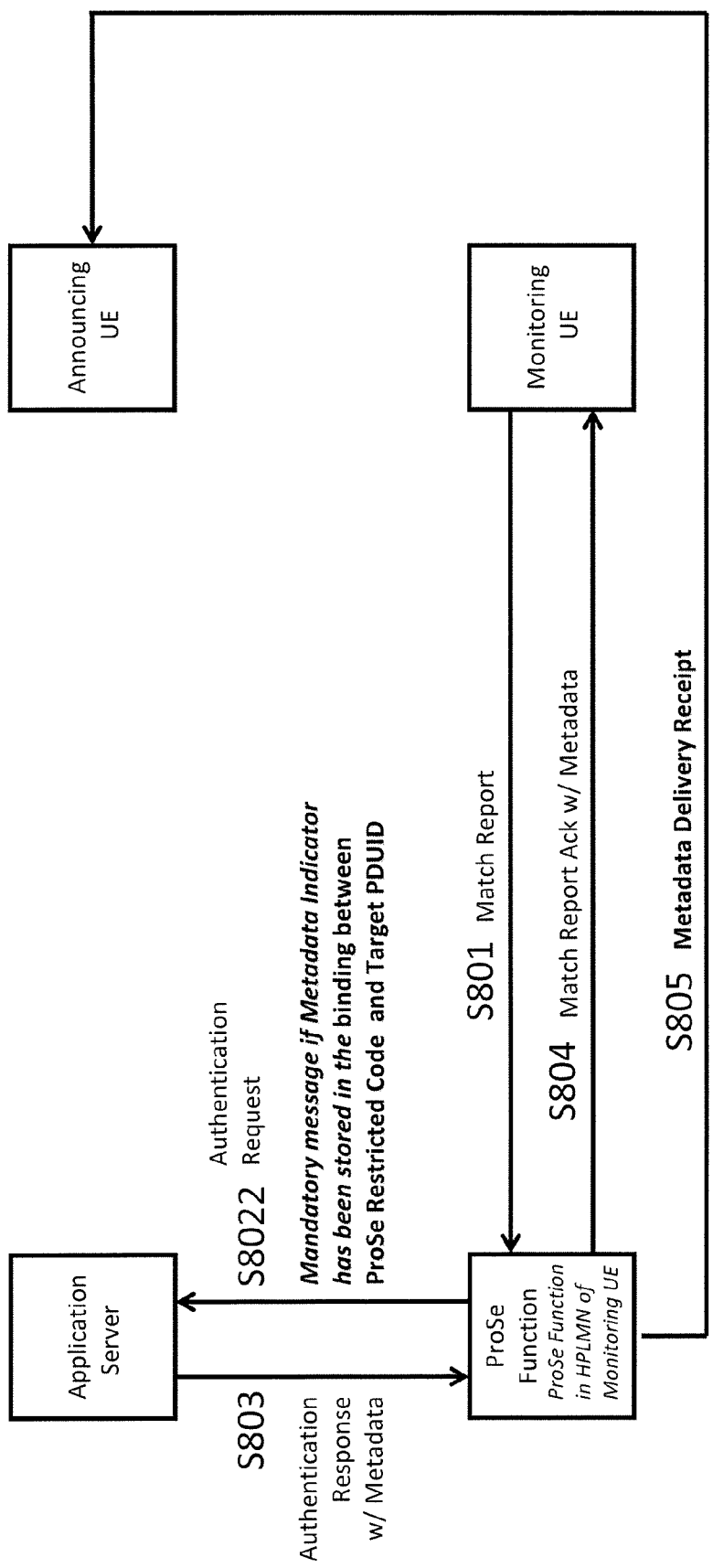
FIG. 8 illustrates a metadata delivery procedure in accordance with a fourth exemplary embodiment of the disclosure.

FIG. 8 illustrates a metadata delivery procedure in accordance with a fourth exemplary embodiment of the disclosure. For this exemplary embodiment, Restricted Discovery is assumed and Announcing UE and Monitoring UE are assumed to be in the same HPLMN as thus use the same ProSe Function. One the concepts of this exemplary embodiment is that if the ProSe Function in HPLMN has sent a Match Report Acknowledgment message which includes a metadata, the ProSe Function would also send a metadata delivery receipt to the Announcing UE. The metadata delivery receipt could be located within an IE (Information Element) of an existing message or an entirely new message. The details are described as follows.

In step S801, a Monitoring UE would transmit a Match Report to a ProSe function in the HPLMN of the Monitoring UE. In step S802, in response to receiving the Match Report, the ProSe Function would transmit to an Application Server an Authentication Request to authenticate the Monitoring UE. The Authentication Request would be a mandatory message if the metadata indicator has been stored in the binding between ProSe Restricted Code and a target PDUID. In step S803, in response to receiving the Authentication Request, the Application Server would transmit to the ProSe Function an Authentication Response which may contain the metadata. In step S804, the ProSe function would transmit a Match Report having the metadata to the Monitor UE. In step S805, the ProSe function would also transmit a metadata delivery receipt to the Announcing UE.

Figure 9:
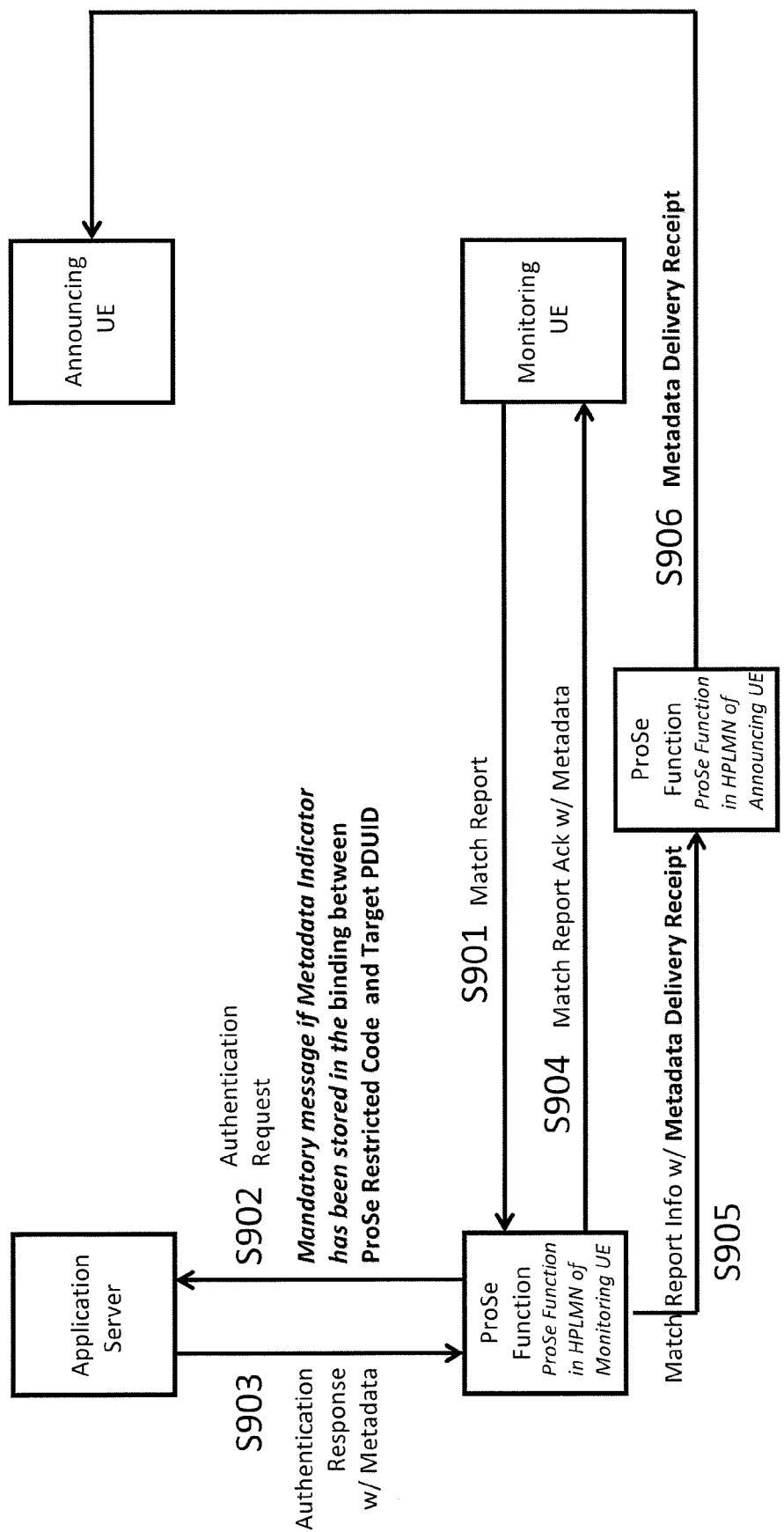
FIG. 9 illustrates a metadata delivery procedure in accordance with a fifth exemplary embodiment of the disclosure.

FIG. 9 illustrates a metadata delivery procedure in accordance with a fifth exemplary embodiment of the disclosure. For this exemplary embodiment, Restricted Discovery is assumed but Announcing UE and Monitoring UE are assumed to be not in the same HPLMN, and thus the Announcing UE and the Monitoring UE would use different HPLMN ProSe Functions. One of the concepts of this exemplar embodiment is that if a ProSe Function in a HPLMN has sent a Match Report Acknowledgement which includes a metadata, the ProSe Function would also send a metadata delivery receipt IE in a Match Report Information message to the ProSe Function in HPLMN of the Announcing UE. Then this ProSe Function would send the metadata delivery receipt as an IE in an existing message or as a new message to the Announcing UE. The details are described as follows.

In step S901, a Monitoring UE would transmit a Match Report to a ProSe function in the HPLMN of the Monitoring UE. In step S902, in response to receiving the Match Report, the ProSe Function would transmit to an Application Server an Authentication Request to authenticate the Monitoring UE. The Authentication Request would be a mandatory message if the metadata indicator has been stored in the binding between ProSe Restricted Code and a target PDUID. In step S903, in response to receiving the Authentication Request, the Application Server would transmit to the ProSe Function an Authentication Response which may contain the metadata. In step S904, the ProSe function would transmit a Match Report having the metadata to the Monitor UE. In step S905, the ProSe function would also transmit a metadata delivery receipt to the ProSe Function located in the HPLMN of the Announcing UE. In step S906, the ProSe Function would transmit the metadata delivery receipt to the Announcing UE.

Figure 10:
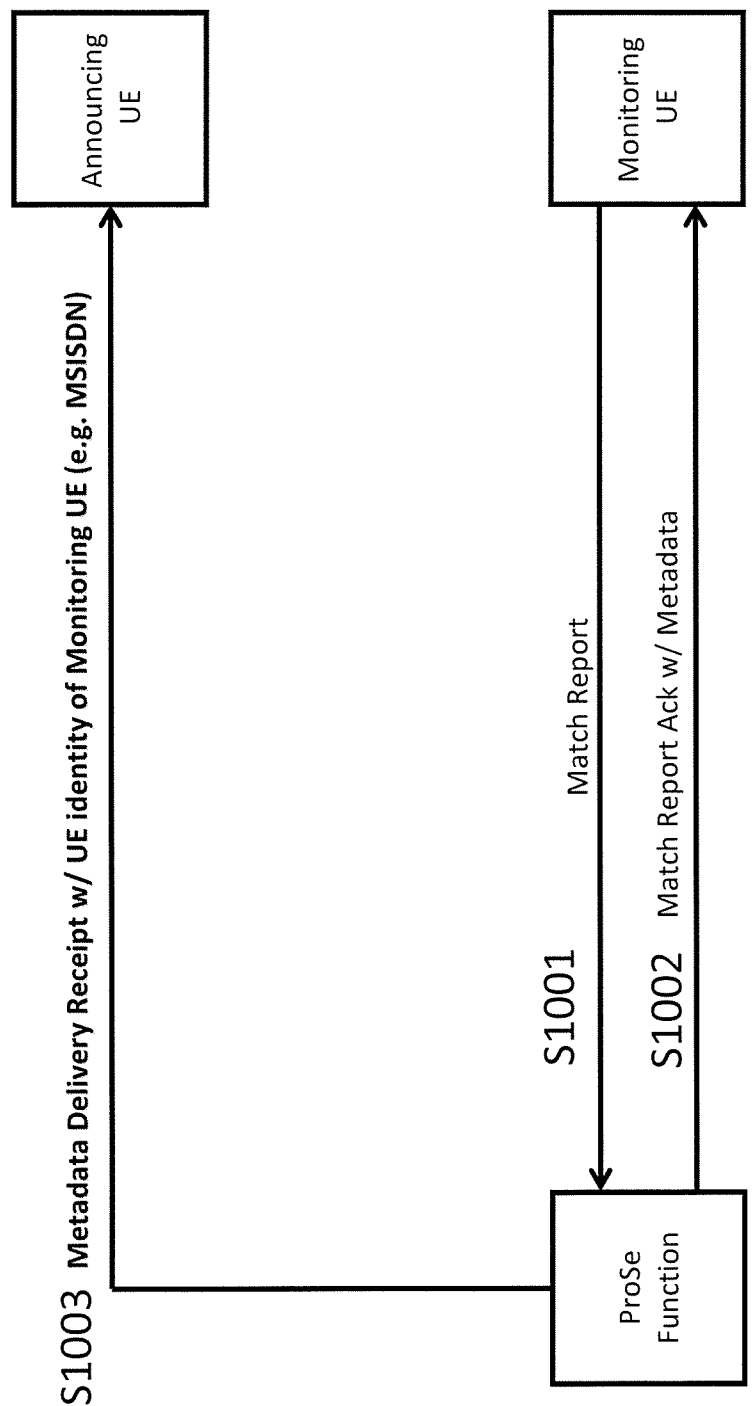
FIG. 10 illustrates a metadata delivery procedure in accordance with a sixth exemplary embodiment of the disclosure.

FIG. 10 illustrates a metadata delivery procedure in accordance with a sixth exemplary embodiment of the disclosure. For this exemplary embodiment, Open Discovery is assumed, and also the Announcing UE and the Monitoring UE are assumed to be in the same PLMN and thus the Announcing UE and the Monitoring UE may use the same HPLMN ProSe Function. One of the concepts is that if the ProSe Function in HPLMN has transmitted a Match Report Acknowledgment message which may include a metadata, the ProSe Function would subsequently transmit a metadata delivery receipt to the Announcing UE. The Metadata Delivery Receipt may be an IE in an existing message or it may be a new message. To describe in further detail, in step S1001, the Monitoring UE may transmit a Match Report to the ProSe Function. In step S1002, in response to receiving the Match Report, the ProSe Function would transmit a Match Report Acknowledgment message which may include the metadata. In step S1003, the ProSe Function would also transmit a metadata delivery receipt along with an ID of the Monitoring UE (e.g. MSISDN).

Figure 11:
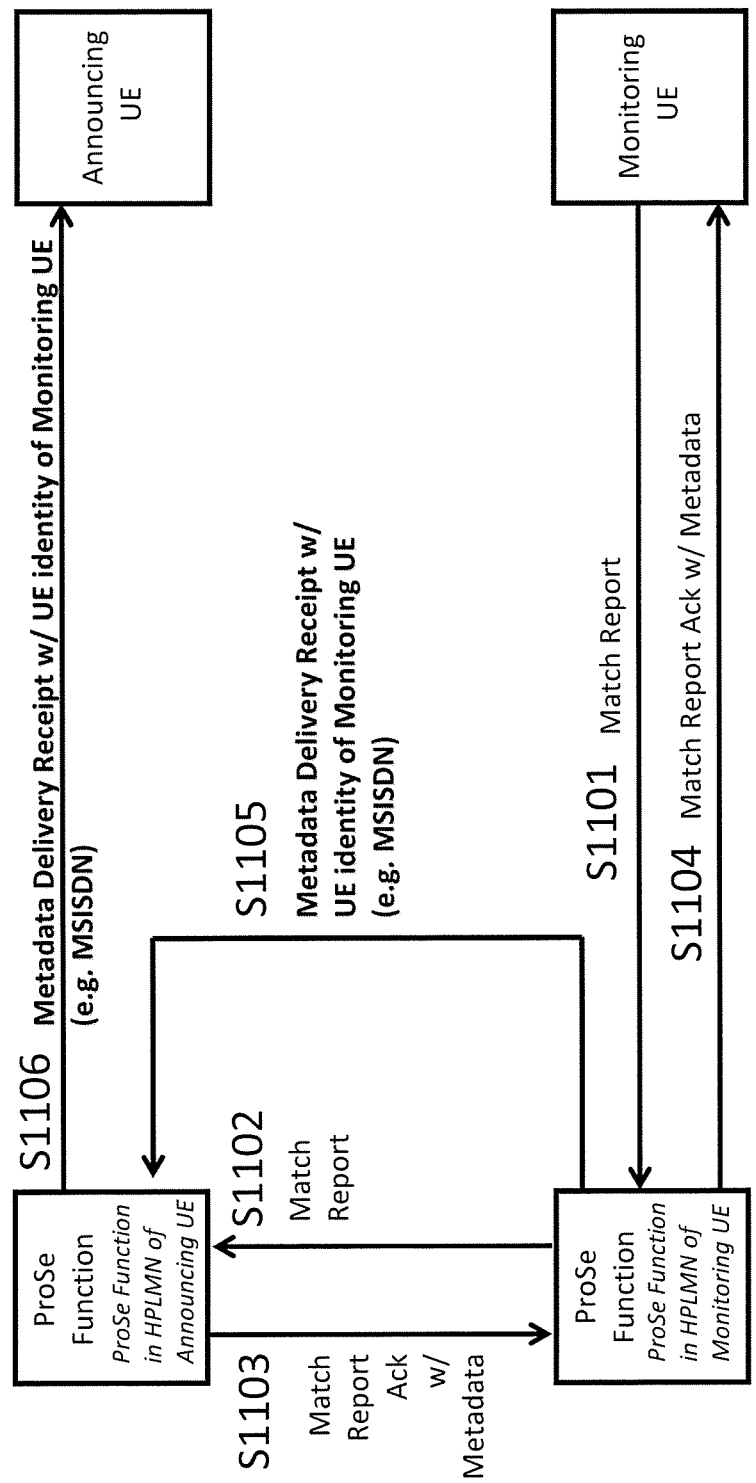
FIG. 11 illustrates a metadata delivery procedure in accordance with a seventh exemplary embodiment of the disclosure.

FIG. 11 illustrates a metadata delivery procedure in accordance with a seventh exemplary embodiment of the disclosure. This exemplary embodiment assumed an Open Discovery but the Announcing and Monitoring UE are not in the same HPLMN and thus the Announcing and Monitoring UE may use different HPLMN ProSe Functions. One of the concepts is that if the ProSe Function in HPLMN of the Monitoring UE has transmitted a Match Report Acknowledgment message which includes a metadata, the ProSe Function in HPLMN of the Monitoring UE would subsequently transmit either a Metadata Delivery Receipt IE in an existing message or a new message to the ProSe Function in HPLMN of the Announcing UE. To describe in further detail, in step S1101, the Monitoring UE would transmit a Match Report to a first ProSe Function located in the HPLMN of the Monitoring UE. In step S1102, the ProSe Function in the HPLMN of the Monitoring UE would transmit the Match Report to a second ProSe Function in the HPLMN of the Announcing UE. In step S1103, the second ProSe Function would transmit a Match Report Acknowledgment having a metadata to the first ProSe Function. In step S1104, the first ProSe Function would transmit the Match Report Acknowledgment having the metadata to the Monitoring UE. In step S1105, the first ProSe Function would transmit a metadata delivery receipt with UE ID of the Monitoring UE (e.g. MSISDN) to the second ProSe Function. In step S1106, the second ProSe Function would transmit a metadata delivery receipt with UE ID of the Monitoring UE (e.g. MSISDN) to the Announcing UE.

Figure 12:
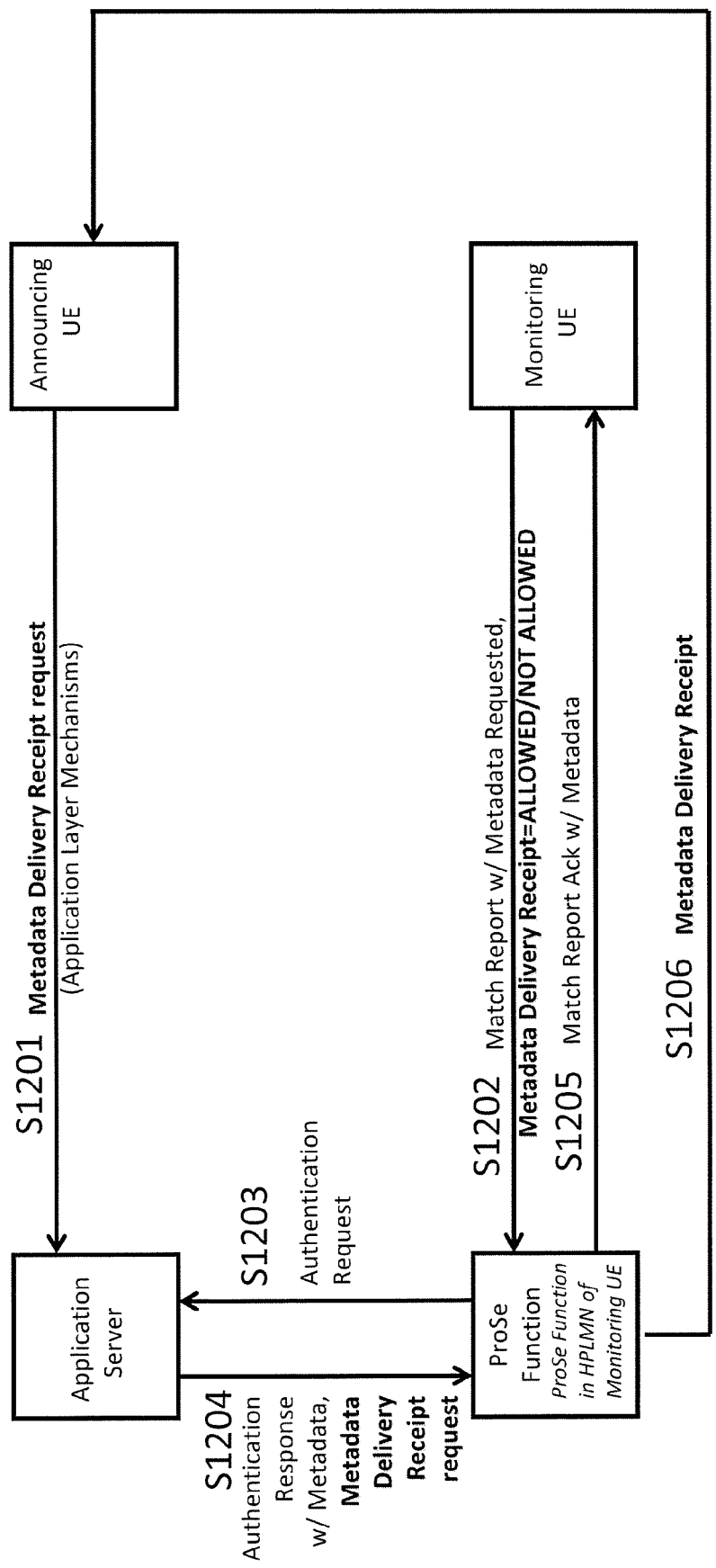
FIG. 12 illustrates a metadata delivery procedure in accordance with an eighth exemplary embodiment of the disclosure.
Figure 16:
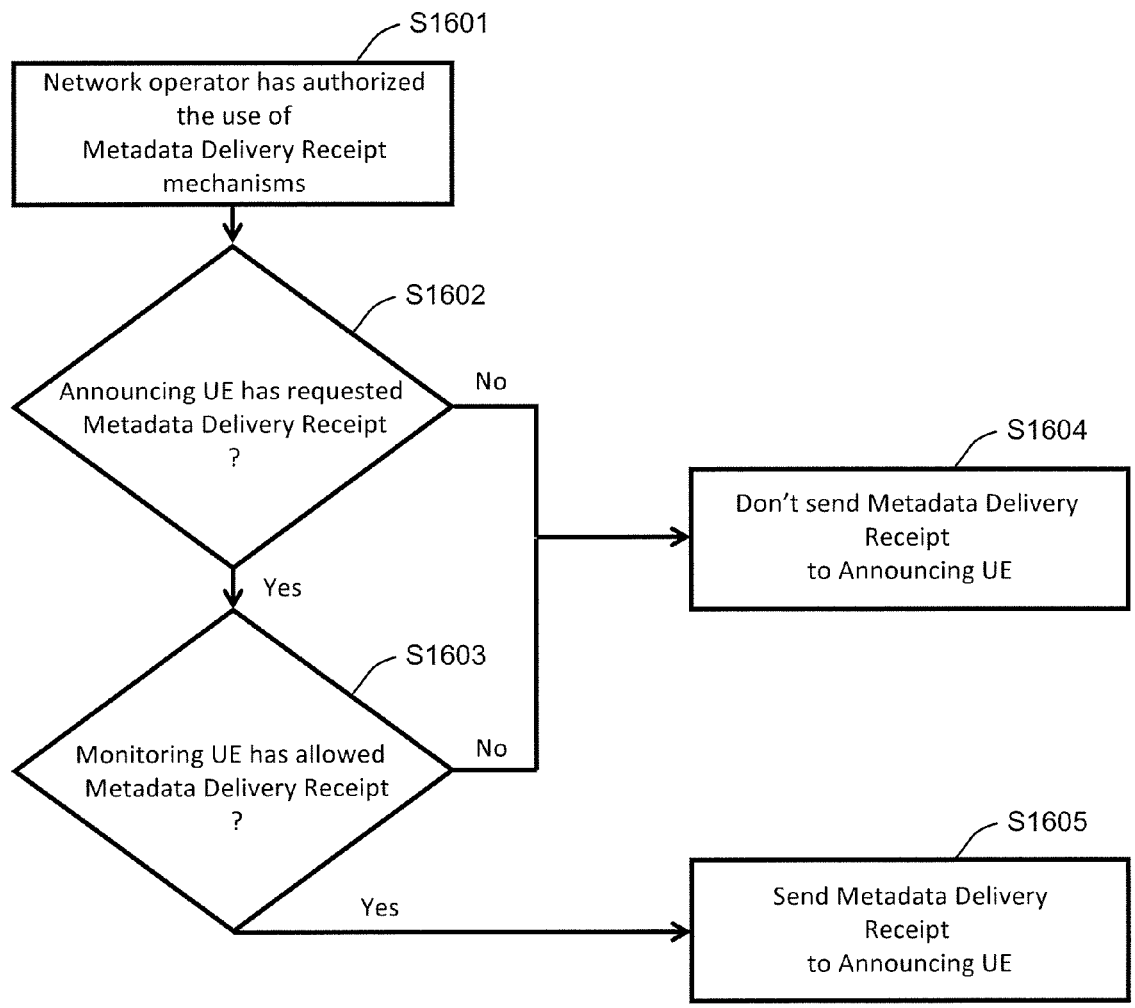
FIG. 16 illustrates a ProSe Function determining actions of Announcing UE and Monitoring UE with regard to the metadata delivery receipt in accordance with one of the exemplary embodiments of the disclosure.

FIG. 12.~FIG. 16. propose a solution to enable the announcing UE to request a metadata delivery receipt and would also enable the monitoring UE to block a metadata delivery receipt to the announcing UE for Open and Restricted Discovery.

FIG. 12 illustrates a metadata delivery procedure in accordance with an eighth exemplary embodiment of the disclosure. This exemplary embodiment assumes Restricted Discovery, and also the Announcing UE and Monitoring UE are in the same PLMN and thus may use the same HPLMN ProSe Function. In step S1201, the Announcing UE may transmit to an Application Server a metadata delivery receipt request. If the Announcing UE would desire a metadata delivery receipt, the Announcing UE would transmit a request to the ProSe Application Server for the metadata delivery receipt. In step S1202, when the Monitoring UE has received a ProSe Restricted Code that matches the Discovery Filter which the Monitor UE has obtained from the Monitor request procedure (and other conditions), the Monitoring UE would transmit to the ProSe Function in HPLMN a Match Report which would include not limited to a metadata delivery receipt IE set to either 'Allowed' or 'Not allowed'. In step S1203, the Match Report would trigger an Authentication Request from the ProSe Function to ProSe Application Server. In step S1204, in response to receiving the Authentication Request, the ProSe Application Server would respond with an Authentication Response which would include not limited to a metadata along with a metadata delivery receipt request. In step S1205, the ProSe Function would transmit to the Monitoring UE a Match Report Acknowledgment which would include the metadata.

In step S1216, in response to the ProSe Function having received the metadata delivery receipt request from Announcing UE via Application Server as well as the metadata delivery receipt indication set to 'Allowed', then the ProSe Function would transmit the metadata delivery receipt to the Announcing UE. However, if the ProSe Function has received the metadata delivery receipt request from the Announcing UE) but the metadata delivery receipt indication has been set to 'Not allowed', then the ProSe function does not send the metadata delivery receipt to the Announcing UE.

Figure 13:
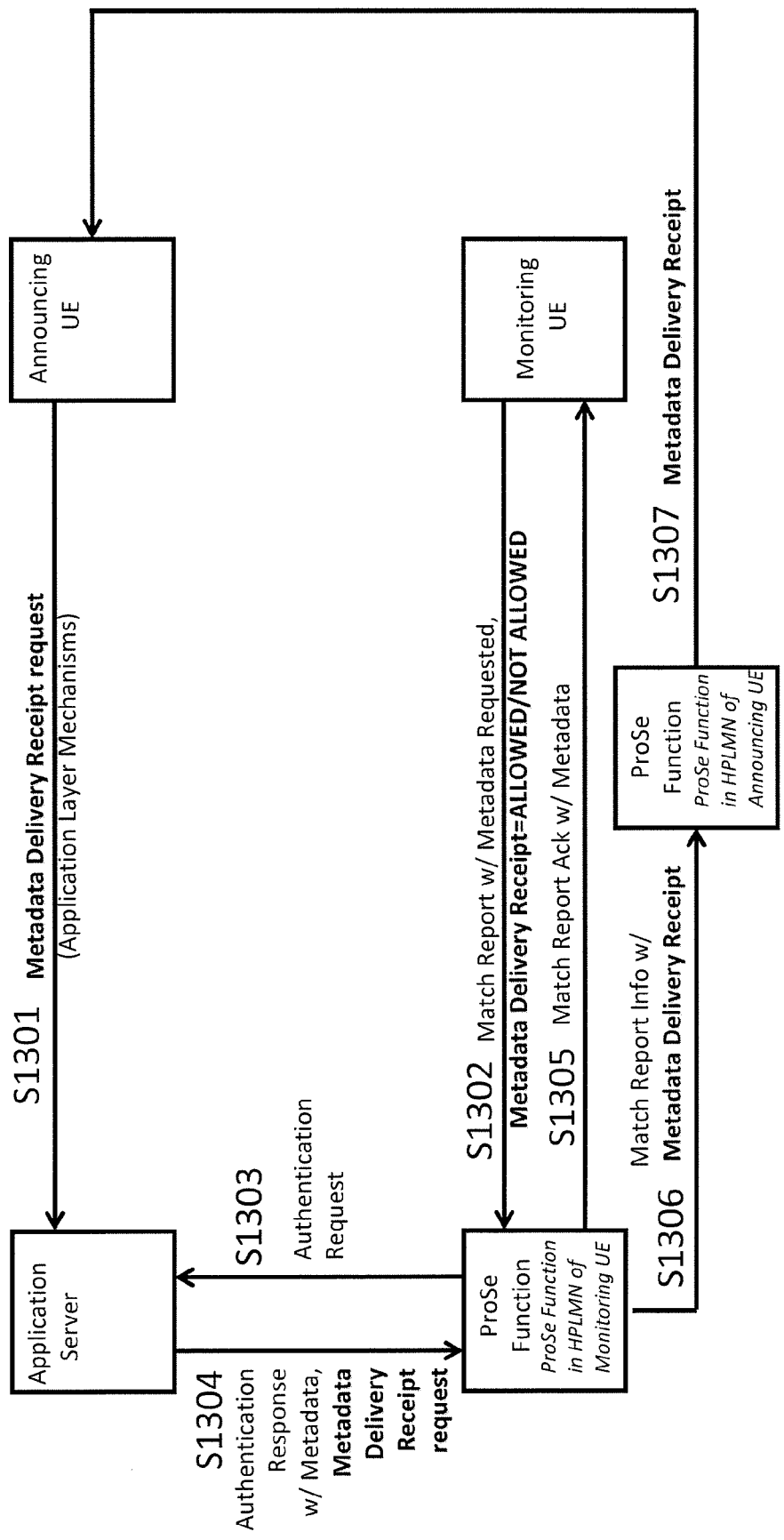
FIG. 13 illustrates a metadata delivery procedure in accordance with a ninth exemplary embodiment of the disclosure.

FIG. 13 illustrates a metadata delivery procedure in accordance with a ninth exemplary embodiment of the disclosure. This exemplary embodiment assumes Restricted Discovery and also the Announcing UE and Monitoring UE are not in the same PLMN, and thus the Announcing UE and Monitoring UE would use different HPLMN ProSe Functions. In step S1301, the Announcing UE may transmit to an Application Server a metadata delivery receipt request. If the Announcing UE would desire a metadata delivery receipt, the Announcing UE would transmit a request to the ProSe Application Server for the metadata delivery receipt. In step S1302, when the Monitoring UE has received a ProSe Restricted Code that matches the Discovery Filter which the Monitor UE has obtained from the Monitor request procedure (and other conditions), the Monitoring UE would transmit to a first ProSe Function in HPLMN of the Monitoring UE a Match Report which would include not limited to a metadata delivery receipt IE set to either 'Allowed' or 'Not allowed'. In step S1303, the Match Report would trigger an Authentication Request from the first ProSe Function to ProSe Application Server. In step S1304, in response to receiving the Authentication Request, the ProSe Application Server would respond with an Authentication Response which would include not limited to a metadata along with a metadata delivery receipt request to the first ProSe Function. In step S1305, the first ProSe Function would transmit to the Monitoring UE a Match Report Acknowledgment which would include the metadata.

In step S1306, in response to the first ProSe Function having received the metadata delivery receipt request from Announcing UE via Application Server as well as the metadata delivery receipt indication set to 'Allowed', then the first ProSe Function in step S1306 would transmit a Match Report Information along with the metadata delivery receipt to a second ProSe Function in HPLMN of the Announcing UE. In step S1307, the second ProSe Function would transmit the metadata delivery receipt to the Announcing UE. The Metadata Delivery Receipt would either exist in an IE of an existing message or exist in a new message sent to the Announcing UE. However, if the first ProSe Function has received the metadata delivery receipt request from the Announcing UE but the metadata delivery receipt indication has been set to 'Not allowed', then in step S1306, the first ProSe function does not send the Match Report information along with the metadata delivery receipt to the second ProSe Function which would not execute step S1307 by sending the metadata delivery receipt to the Announcing UE.

Figure 14:
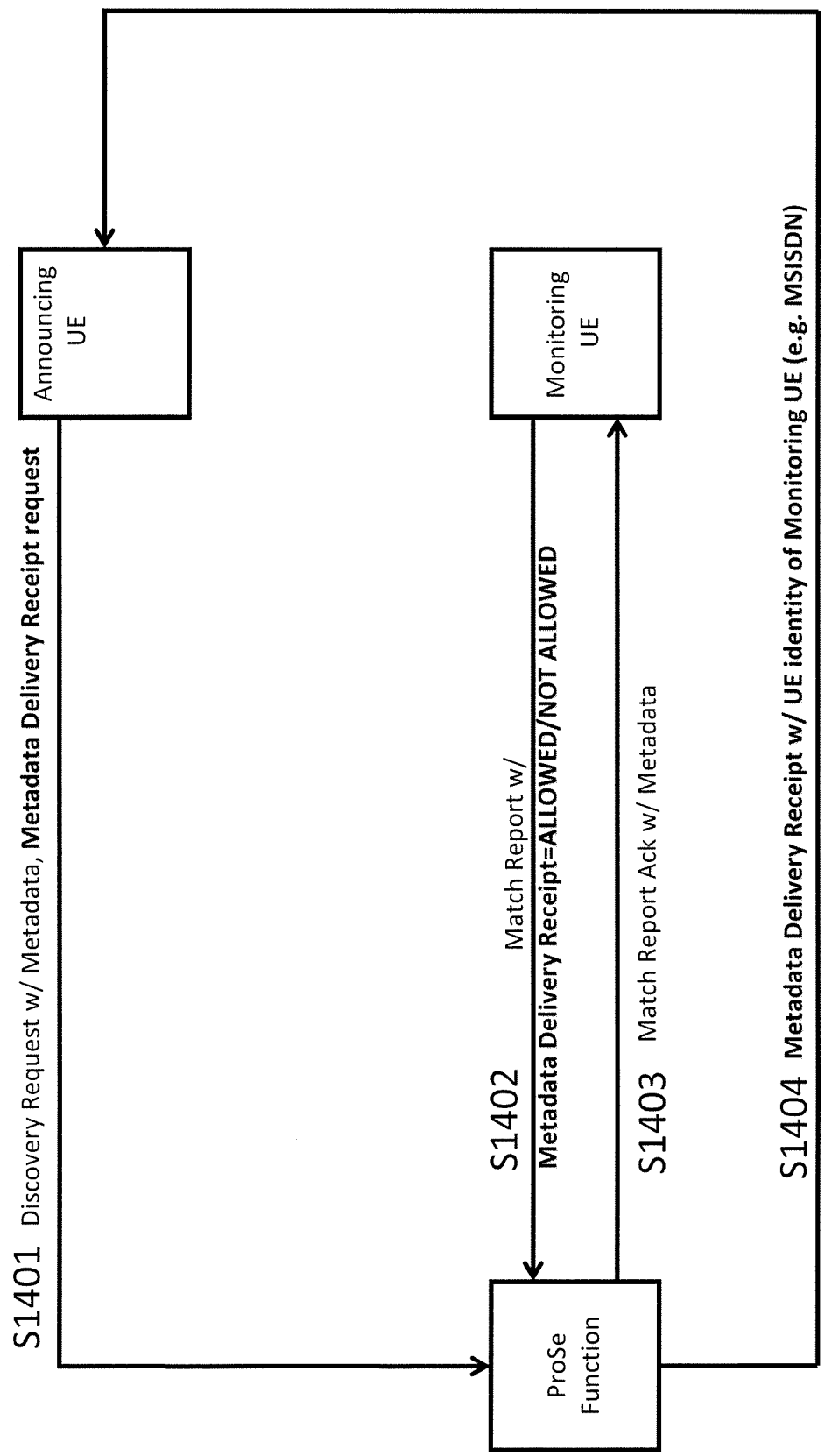
FIG. 14 illustrates a metadata delivery procedure in accordance with a tenth exemplary embodiment of the disclosure.

FIG. 14 illustrates a metadata delivery procedure in accordance with a tenth exemplary embodiment of the disclosure. This exemplary embodiment assumes Open Discovery and also the Announcing and the Monitoring UE are in the same PLMN and thus use the same HPLMN ProSe Function. In step S1401, if the Announcing UE desires a metadata delivery receipt, the Announcing UE would send a metadata delivery receipt request in a Discovery Request message to the ProSe Application Server. In step S1402, when the Monitoring UE has received a ProSe Code over the air that matches the Discovery Filter which the monitoring UE has obtained from the Monitor request procedure (and other conditions), the Monitoring UE would transmit a Match Report to ProSe Function in HPLMN. The Match Report would include a metadata delivery receipt IE set to either 'Allowed' or 'Not allowed'.

In step S1403, if the ProSe Function in HPLMN of the Monitoring UE has received the metadata delivery receipt request from the Announcing UE and the metadata delivery receipt indication has been set to 'Allowed', then the ProSe Function would transmit a Match Report Acknowledgment having the metadata. In step S1404, the ProSe Function would transmit to the Announcing UE the metadata delivery receipt along with the UE identity of the Monitoring UE (e.g. MSISDN) either as IE of an existing message or within a new message to the Announcing UE.

However, if the ProSe Function in HPLMN of the Monitoring UE has received the Metadata Delivery Receipt request from the Announcing UE but the Metadata Delivery Receipt indication has been set to 'Not allowed', then in step S1404 the Metadata Delivery Receipt would not be sent to the Announcing UE.

Figure 15:
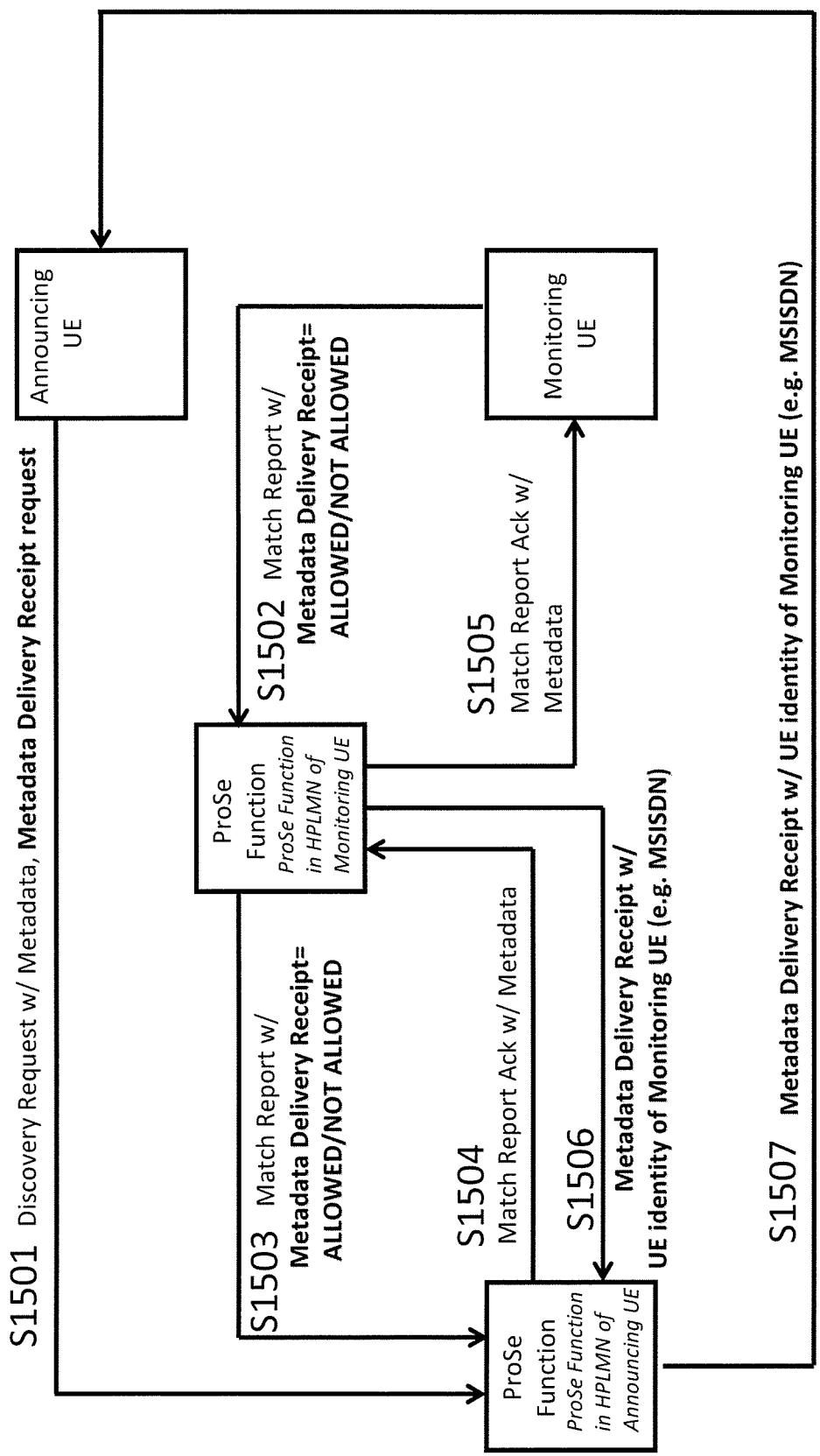
FIG. 15 illustrates a metadata delivery procedure in accordance with an eleventh exemplary embodiment of the disclosure.

FIG. 15 illustrates a metadata delivery procedure in accordance with an eleventh exemplary embodiment of the disclosure. This exemplary embodiment assumes Open Discovery and the Announcing UE and Monitoring UE are not in the same PLMN and thus the Announcing UE and Monitoring UE don't use the same HPLMN ProSe Functions. In step S1501, if the Announcing UE desires a metadata delivery receipt, the Announcing UE would transmit a metadata delivery receipt request in the Discovery Request message to the first ProSe Function in HPLMN of the Announcing UE. In step S1502, when the Monitoring UE has received a ProSe Code that matches the Discovery Filter it obtained from the Monitor request procedure (and other conditions), the Monitoring UE would transmit a Match Report to the second ProSe Function in HPLMN of the Monitoring UE. The Match Report may include the metadata delivery receipt IE set to either 'Allowed' or 'Not allowed'. In step S1503, the second ProSe Function may forward this Match Report message to the first ProSe Function. In step S1504, if the first ProSe Function would transmit a Match Report Acknowledgment message which includes the metadata to the Monitoring UE. In step S1505, in response to receiving the Match Report Acknowledgment message, the second ProSe Function would transmit a Match Report Acknowledgment message to the Monitoring UE.

In step S1506, the second ProSe Function would transmit the metadata delivery receipt along with the UE ID of the Monitoring UE to the first ProSe Function. If the first ProSe Function has received the metadata delivery receipt request from Announcing UE and the metadata delivery receipt indication has set to 'Allowed' from the Monitoring UE via second ProSe Function then the first ProSe Function would transmit to the first Announcing UE the metadata delivery receipt either as IE in an existing message or in a new message. If the second ProSe Function has received the metadata delivery receipt request from the Announcing UE and the metadata delivery receipt indication has been set to 'Not allowed', then the second ProSe Function instead would not transmit the metadata delivery receipt to the Announcing UE.

FIG. 16 illustrates a ProSe Function determining actions of Announcing UE and Monitoring UE with regard to the metadata delivery receipt in accordance with one of the exemplary embodiments of the disclosure. In step S1601, if the ProSe Function has determined that the network operator has authorized the use of the metadata delivery receipt mechanisms, then the procedure would proceed in step S1602. In step S1602, the ProSe Function would determine whether the Announcing UE has requested a metadata delivery receipt. If so, the procedure continues in step S1603; otherwise the procedure continues in step S1604 in which the ProSe Function would not transmit a metadata delivery receipt to the Announcing UE. In step S1603, ProSe Function would determine whether the Monitoring UE has allowed the metadata delivery receipt to be delivered to the Announcing UE. If so, then in step S1605, the ProSe Function would transmit a metadata delivery receipt to the Announcing UE; otherwise, step S1604 would be executed.

Essentially if the network operator has authorized the use of the metadata delivery receipt mechanisms, the Announcing UE has requested the metadata delivery receipt, and the Monitoring UE has allowed the metadata delivery receipt to be delivered to the Announcing UE, then the metadata delivery receipt would be transmitted to the Announcing UE. If the network operator has authorized use of the metadata delivery receipt mechanisms, the Announcing UE has not requested metadata delivery receipt, and the Monitoring UE has allowed metadata delivery receipt, then the metadata delivery receipt may be sent to the Announcing UE (depending, for instance, on Network Operator policy).

If the network operator has authorized use of the metadata delivery receipt mechanisms, the Announcing UE has requested metadata delivery receipt, and the Monitoring UE has not allowed the metadata delivery receipt, then the metadata delivery receipt would not be sent to the Announcing UE.

If the network operator has authorized use of the metadata delivery receipt mechanisms and the Announcing UE has not requested metadata delivery receipt and the Monitoring UE has not allowed metadata delivery receipt then the metadata delivery receipt is not sent to the Announcing UE.

Figure 17:
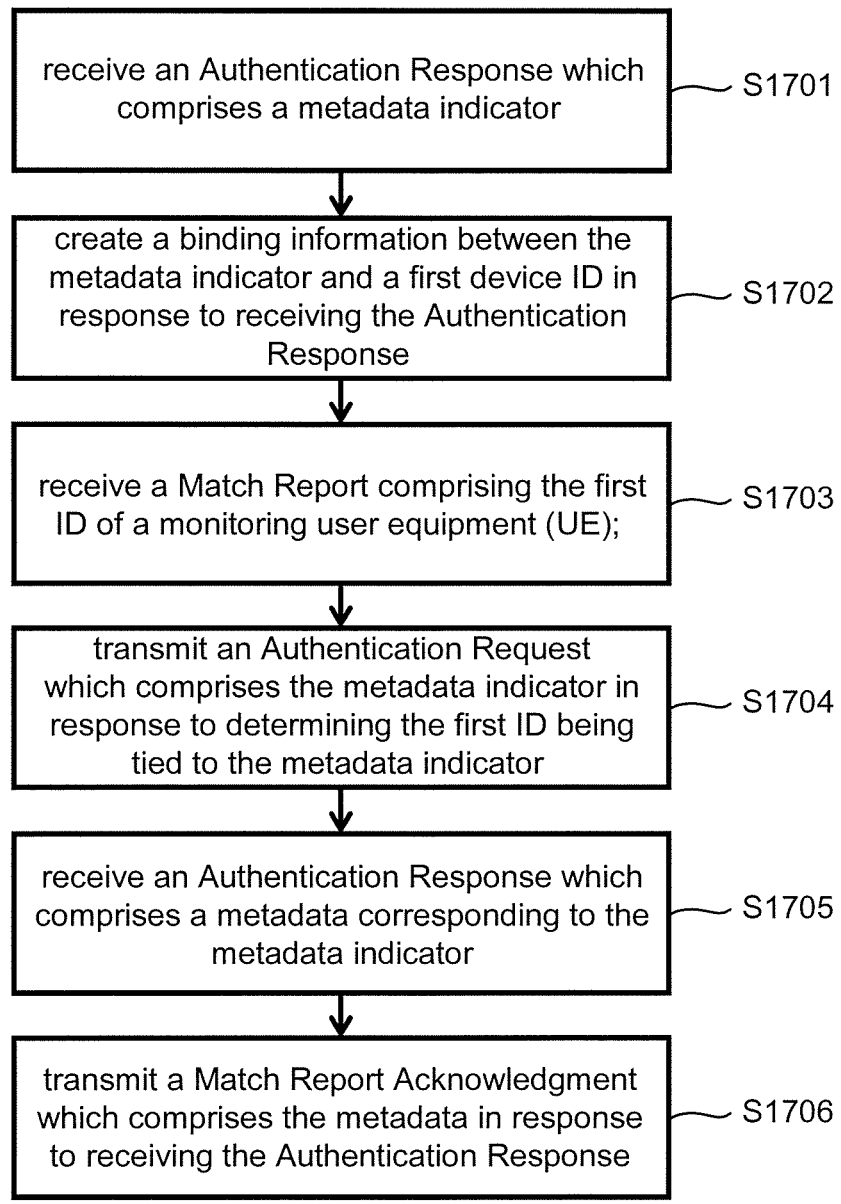
FIG. 17 illustrates a metadata delivery method from the perspective of a ProSe Function for D2D communication in accordance with one of the exemplary embodiments of the disclosure.

FIG. 17 illustrates a metadata delivery method from the perspective of a ProSe Function for D2D communication in accordance with one of the exemplary embodiments of the disclosure. (This part will be written after the claims are determined to be okay. Also ignore the drawings. There are some errors.)

Figure 18:
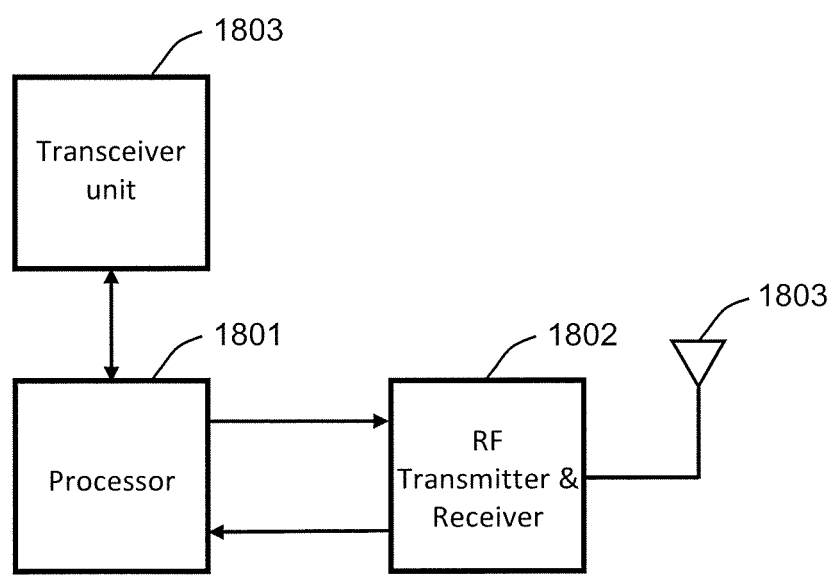
FIG. 18 illustrates the hardware of a ProSe function in terms of functional block diagrams in accordance with one of the exemplary embodiments of the disclosure.

FIG. 18 illustrates the hardware of a ProSe function in terms of functional block diagrams in accordance with one of the exemplary embodiments of the disclosure. The ProSe function could be a server or an apparatus which would include not limited to a processor 1801 coupled to a RF transceiver unit 1802, an antenna array 1803, and a transceiver unit 1804. The RF transceiver unit 1802 would include a RF transmitter for transmissions in the RF spectrum and a RF receiver for transmitters in the RF spectrum. The RF transceiver unit 1802 could also be a millimeter wave transceiver. The antenna array would include one or more antenna and is thus capable of beam forming. The transceiver unit 1804 may contain one or more transceivers and is configured for communicating with another device or server such as an application server or another network node in a wireless or cabled manner. The processor 1801 is for executing the metadata delivery method of FIG. 17 as well as all aforementioned exemplary embodiments. The processor 1801 may contain one or more physical processors, and functions of the processor 1801 could be implemented by using software or hardware such as by using programmable units such as a micro-processor, a micro-controller, digital signal processor (DSP) chips, a field-programmable gate array (FPGA), etc. Also the functions of the processor 1801 may also be implemented with separate electronic devices or ICs.

In view of the aforementioned descriptions, the present disclosure is suitable for being used in a wireless communication system and is able to ensure that metadata is delivered to a monitoring UE for restricted ProSe Direct Discovery, to inform an announcing UE that metadata has been delivered to certain monitoring UEs for Open and Restrict Discovery, and to enable the announcing UE to request a metadata delivery receipt and would also enable the monitoring UE to block a metadata delivery receipt to the announcing UE for Open and Restricted Discovery.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A metadata delivery method used by a proximity-based services (ProSe) Function, the method comprising:
   receiving a first Authentication Response (S204) which comprises a metadata indicator;
   creating a binding information (S205) between at least the metadata indicator and a Restricted ProSe Application User ID (RPAUID) in response to receiving the first Authentication Response, wherein the metadata indicator indicates whether the metadata is associated with the RPAUID, wherein the binding information comprises the metadata indicator, a target ProSe Discovery UE ID (PDUID) and a ProSe Restricted Code;
   receiving a Match Report comprising the RPAUID (S206);
   transmitting a second Authentication Request (S207) which comprises the metadata indicator in response to determining that the metadata indicator matches to the RPAUID;
   receiving a second Authentication Response (S208) which comprises a metadata corresponding to the metadata indicator in response to transmitting the second Authentication Request; and
   transmitting a Match Report Acknowledgment (S209) which comprises the metadata in response to receiving the second Authentication Response.

2. The method of claim 1 further comprising:
   transmitting the second Authentication Request (S403) which does not have the metadata indicator in response to determining that the metadata indicator is not tied to the RPAUID; and
   receiving the second Authentication Response without the metadata in response to the second Authentication Request not having the metadata indicator.

3. The method of claim 1 further comprising:
   not transmitting the second Authentication Request (S503) in response to determining that the metadata indicator is not tied to the RPAUID.

4. The method of claim 1 further comprising:
   receiving a Discovery Request (S202); and
   transmitting a first Authentication Request (S203) in response to receiving the Discovery Request; and
   transmitting a Discovery Response (S307) comprising the metadata indicator in response to determining that the metadata indicator matches to the RPAUID.

5. The method of claim 1 further comprising:
   receiving the Match Report (S601) which further comprises the metadata indicator; and
   transmitting a Match Report Acknowledgement (S607) which comprises the metadata which corresponds to the metadata indicator in response to determining that the metadata indicator matches to the RPAUID.

6. The method of claim 5 further comprising:
   receiving the first Authentication Response without the metadata indicator after determining that the metadata indicator does not match the RPAUID (S703).

7. The method of claim 4 further comprising:
   transmitting a Match Report Acknowledgement (S804) which comprises the metadata; and
   determining whether to transmit (S805 or S906) a metadata delivery receipt.

8. The method of claim 7, further comprising:
   transmitting the first Authentication Request (S902) which comprises the metadata indicator in response to that the metadata indicator has been stored in the binding information and is in binding with the RDUID and the ProSe Restrict Code.

9. The method of claim 8 further comprising:
   transmitting the metadata delivery receipt (S1003) which comprises a Mobile Station International Subscriber Directory Number (MSISDN).

10. The method of claim 7, wherein the Match Report (S1202) further comprises a metadata delivery receipt indication which is a binary number and set as either allowed or not allowed.

11. The method of claim 10 further comprising:
    receiving the first Authentication Request (S1304);
    determining whether the first Authentication Request comprises a metadata delivery receipt request; and
    determining whether to transmit a metadata delivery receipt based on whether the first Authentication Request comprises the metadata delivery receipt request and the metadata delivery receipt indication.

12. The method of claim 11 further comprising:
    not transmitting the metadata delivery receipt (S1602, S1604) in response to the first Authentication Request does not comprise the metadata delivery receipt request.

13. The method of claim 11 further comprising:
    not transmitting the metadata delivery receipt (S1602, S1603, S1604) in response to the first Authentication Request does not comprise the metadata delivery receipt request and also in response to the metadata delivery receipt indication set to not allowed.

14. The method of claim 11 further comprising:
    transmitting the metadata delivery receipt (S1602, S1603, S1605) in response to the first Authentication Request comprises the metadata delivery receipt request and also in response to the metadata delivery receipt indication set to allowed.

15. A proximity-based services (ProSe) Function apparatus comprising:
    a transmitter;
    a receiver; and
    a processor coupled to the transmitter and the receiver and is configured at least to:
    receive, via the receiver, a first Authentication Response (S204) which comprises a metadata indicator;

create a binding information (S205) between at least the metadata indicator and a Restricted ProSe Application User ID (RPAUID) in response to receiving the first Authentication Response, wherein the metadata indicator indicates whether the metadata is associated with the RPAUID, wherein the binding information comprises the metadata indicator, a target ProSe Discovery UE ID (PDUID) and a ProSe Restricted Code;

receive, via the receiver, a Match Report comprising the RPAUID (S206);

transmit, via the transmitter, a second Authentication Request (S207) which comprises the metadata indicator in response to determining that the metadata indicator matches to the RPAUID;

receive, via the receiver, a second Authentication Response (S208) which comprises a metadata corresponding to the metadata indicator in response to the second Authentication Request; and transmit, via the transmitter, a Match Report Acknowledgment (S209) which comprises the metadata in response to receiving the second Authentication Response.

16. The ProSe Function apparatus of claim 15, wherein the processor is further configured to:

transmit, via the transmitter, the second Authentication Request message (S403) which does not have the metadata indicator in response to determining that the metadata indicator is not tied to the RPAUID; and receive, via the receiver, the second Authentication Response without the metadata in response to the second Authentication Request message not having the metadata indicator.

17. The ProSe Function apparatus of claim 15, wherein the processor is further configured to:

not transmit, via the transmitter, the second Authentication Request message (S503) in response to determining that the metadata indicator is not tied to the RPAUID.

18. The ProSe Function apparatus of claim 15, wherein the processor is further configured to:

receive, via the receiver, a Discovery Request (S202); and transmit, via the transmitter, a first Authentication Request (S203) in response to receiving the Discovery Request; and transmit, via the transmitter, a Discovery Response (S307) comprising the metadata indicator in response to determining that the metadata indicator matches to the RPAUID.

19. The ProSe Function apparatus of claim 15, wherein the processor is further configured to:

receive, via the receiver, the Match Report (S601) which further comprises the metadata indicator; and transmit, via the transmitter, a Match Report Acknowledgement (S607) which comprises the metadata which corresponds to the metadata indicator in response to determining that the metadata indicator matches to the RPAUID.

20. The ProSe Function apparatus of claim 19, wherein the processor is further configured to:

receive, via the receiver, the first Authentication Response without the metadata indicator after determining that the metadata indicator does not match the RPAUID (S703).

* * * * *